United States Patent [19]

Leonowicz et al.

[11] Patent Number: 4,892,721

[45] Date of Patent: * Jan. 9, 1990

[54] CRYSTALLINE ZEOLITE MATERIALS CONSTITUTING MAZ-MORITE INTERMEDIATES

[75] Inventors: Michael E. Leonowicz, Neshanic Station; David E. W. Vaughan, Flemington; Karl G. Strohmaier, Port Murray, all of N.J.

[73] Assignee: Exxon Research and Engineering Company, Florham Park, N.J.

[*] Notice: The portion of the term of this patent subsequent to Apr. 14, 2004 has been disclaimed.

[21] Appl. No.: 33,244

[22] Filed: Apr. 2, 1987

Related U.S. Application Data

[63] Continuation-in-part of Ser. No. 713,050, Mar. 18, 1985, Pat. No. 4,657,748.

[51] Int. Cl.$^4$ ............................................. C01B 33/28
[52] U.S. Cl. ..................................................... 423/328
[58] Field of Search ............... 423/328, 329, 326, 330; 502/64, 60

[56] References Cited

U.S. PATENT DOCUMENTS 4,021,447 5/1977 Rubin et al. .......................... 423/328
4,657,748 4/1987 Vaughan et al. .................... 423/329

Primary Examiner—John Doll
Assistant Examiner—R. Bruce Breneman
Attorney, Agent, or Firm—Henry E. Naylor; Ronald D. Hantman

[57] ABSTRACT

Disclosed are unique orthorhombic porous tectosilicates intermediate between mordenite (MOR), mazzite (MAZ), and "Omega". Such materials are characterized by an 'a' axis value of 7.3Å, a 'b' axis value of 18.1Å and a 'c' axis value that is a multiple sum of 10.6Å (MOR sheet) and 15.6Å (MAZ, "Omega" sheet).

23 Claims, 21 Drawing Sheets

D₂Z₂

D₂O₂

$D_2Z_1Z_2$ $D_1D_1Z_1Z_1$ $D_1D_2Z_1Z_2$ $D_1D_1O_2O_1$ $D_1D_2O_2O_2$

CRYSTALLINE ZEOLITE MATERIALS CONSTITUTING MAZ-MORITE INTERMEDIATES

This application is a continuation-in-part application of copending Ser. No. 713,050, filed Mar. 18, 1985, now U.S. Pat. No. 4,657,748.

This invention relates to novel crystalline porous tectosilicates, and to methods for their preparation.

Zeolite materials, both natural and synthetic, have been demonstrated in the past to have catalytic capabilities for various types of hydrocarbon conversion. Zeolite materials are ordered porous crystalline aluminosilicates having a definite crystalline structure within which are a large number of pores, or cavities and channels that are precisely uniform in size. Since the dimensions of these pores are such as to accept adsorption molecules of certain dimensions, while rejecting those of larger dimensions, these materials have been referred to as "molecular sieves" and are utilized in a variety of ways to take advantage of these properties, such as shape selective catalysis and purification of mixtures of molecules.

Such molecular sieves include a wide variety of positive ion-containing crystalline aluminosilicates, both natural and synthetic. These aluminosilicates can be described as rigid three-dimensional networks of $SiO_4$ and $AlO_4$ in which the tetrahedra are cross-linked by the sharing of oxygen atoms whereby the ratio of the total aluminum and silicon atoms to oxygen is 1:2. The electrovalence of the tetrahedra-containing aluminum is balanced by the inclusion in the crystal of a cation, for example an alkali metal or an alkaline earth metal cation. This can be expressed by a formula wherein the ratio of Al to the number of various cations, such as Ca/2, Sr/2, Na, K, Li or tetraalkyl ammonium is equal to unity.

The use of quaternary ammonium salts as templates or reaction modifiers in the preparation of synthetic crystalline zeolites, first discovered by R. M. Barrer in 1961, has led to preparation of zeolites with high silica to alumina ratios which are not found in nature. Reviews by Barrer ("Hydrothermal Chemistry of Zeolites", Academic Press, 1982) and Lok et al (Zeolites, vol. 3 (1983), p. 282) show the large number of zeolites that can be made in various organic template systems. A number of those zeolites may also be made without the templates. Although some zeolites are characterized as being made in the presence of but a single template, that same template may be used in the crystallization of a variety of zeolites. The type zeolite which is produced is, in addition, a function of the reaction mixture composition, reaction and nucleation conditions and other variables that influence these metastable crystallization systems.

One type of cation may be exchanged, either in entirety or partially, by another type of cation, utilizing ion exchange techniques in a conventional manner. By means of such cation exchange, it has been possible to vary the size and volume of the pores in the given aluminosilicate by suitable selection of the particular cation. The spaces between the tetrahedra are occupied by molecules of water prior to dehydration. The tetrahedral Si and Al atoms may, in some cases, be substituted by $Fe^{3+}$, $Cr^{3+}$, $Ga^{3+}$, $Ge^{4+}$, $Ni^{2+}$, and $Co^{2+}$.

Prior art techniques have resulted in the formation of a considerable number of synthetic crystalline aluminosilicates, many of which are isostructural with known minerals. Mordenite, mazzite (ZSM-4 (U.S. Pat. No. 3,923,639)), and Omega (U.S. Pat. No. 4,241,036) are typical of the latter, and ECR-1 (copending U.S. patent application No. 713,050) is typical of a material known only from synthetic chemistry. A further category of structures is known only from conjecture, and represents possible structures in a theoretical sense, but without experimental evidence. Many such theoretical structural possibilities have been discussed in the literature (e.g. J. V. Smith, American Mineralogist, 62 p. 703 (1977); A. F. Wells, Acta Cryst., B25, p. 1711 (1969)). A particular structure of interest is a theoretical structure "Omega" described by Barrer and Villiger (Chem. Comm., p. 659, (1969)). It is interesting to note that the scientific literature has not recognized the materials of this invention.

SUMMARY OF THE INVENTION

The present invention relates to unique orthorhombic porous tectosilicates intermediate between mordenite (MOR), mazzite (MAZ) and "Omega". Such materials are characterized by an 'a' axis value of 7.3Å, a 'b' axis value of 18.1Å and a 'c' axis value that is a multiple sum of 10.6Å (MOR sheet) and 15.6Å (MAZ, "Omega" sheet). This invention includes mixtures of such materials. As all of the subject materials are characterized by a one dimensional 12-ring channel parallel to the 'a' axis, the macro-properties of these structures will have much in common. The present invention is also directed to methods of preparation of these materials. These materials may be used in such areas as hydrocarbon conversion (cracking, hydrocracking, isomerization, alkylation, polymerization, dehydration, reforming etc.), molecular sieving and selective sorption. In the anhydrous state these materials will have the general composition:

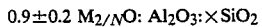

$$0.9 \pm 0.2\ M_{2/N}O: Al_2O_3: X\ SiO_2$$

where M is a group 1A, 2A, and/or alkyl ammonium cation, and x is greater than 3. N is the valence of the cation M.

Precedents for such groups of materials as the MAZ-MOR properties are zeolite T (U.S. Pat. No. 2,950,952), which is a family of intergrowth materials comprising varying amounts of offretite, erionite and intermediate species, and the "pentasil" family (U.S. Pat. No. 4,229,424; G. T. Kokotailo and W. M. Maier, "Pentasil Family of High Silica Crystalline Materials" and Properties and Application of Zeolites (Ed R. P. Townsend) p. 133-39, (1980), Royal Chem. Soc. (London), representing structures derived from various combinations and manipulations of ZSM-5 and ZSM-11.

DETAILED DESCRIPTION OF THE INVENTION

Figure 1:
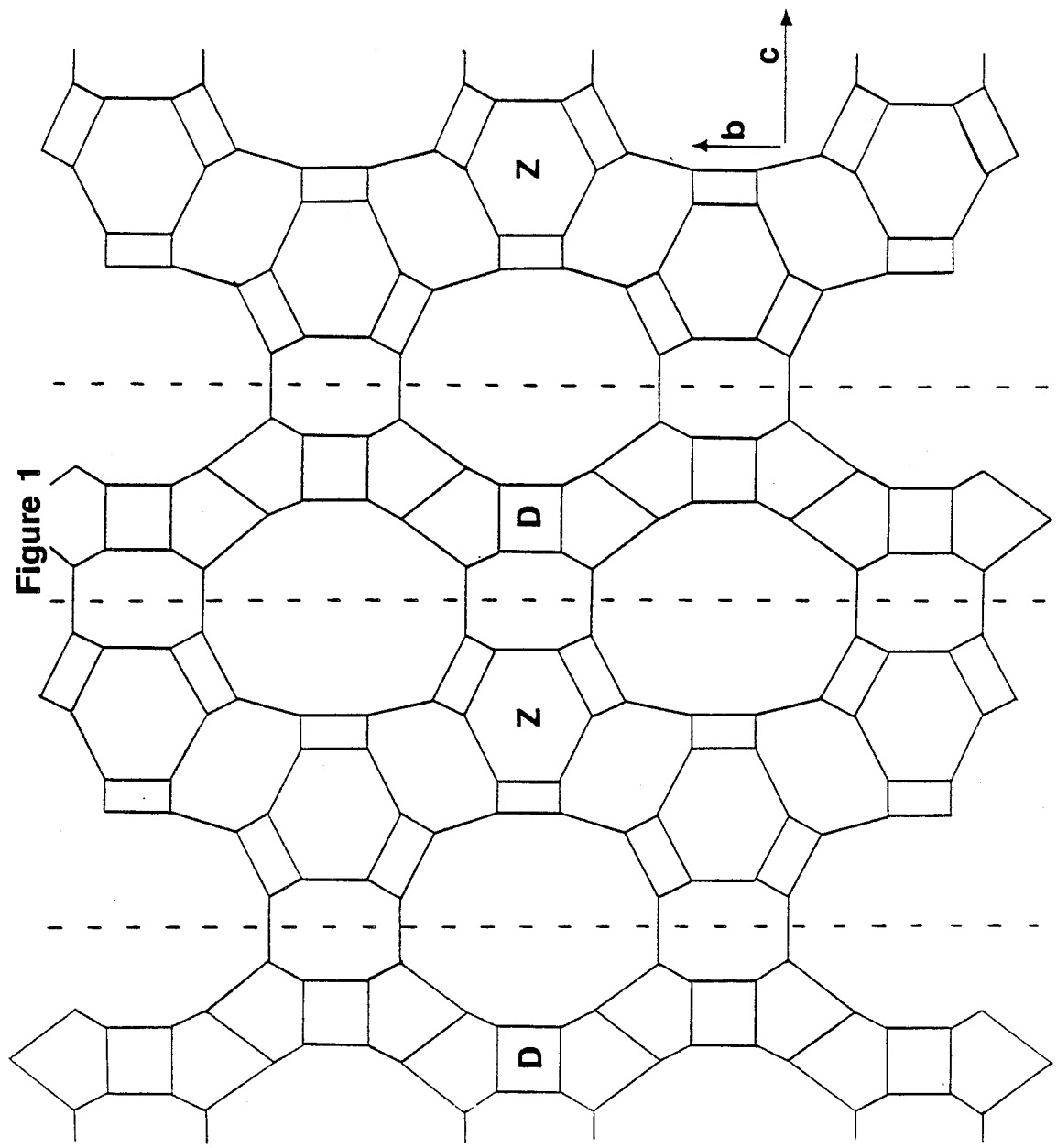
FIG. 1 A diagram of structure of ECR-1 as viewed down the 7.3Å a axis. Dashed lines separate mazzite layers (marked Z) and mordenite layers (marked D). The orientation of the lattice direction b and c is indicated.

The zeolites of this invention are characterized by the x-ray powder diffraction pattern given in Table I. The tentative indexing is orthorhombic (c=26.2 Å, b=18.3 Å and a=7.3 Å,) and may be orthofhombic in other exchanged forms. The morphology, like ECR-1, is characteristically long laths or needles with an aspect ratio of about 10 when using the disclosed preparations. The true value of 'c' will be as shown above or a multiple sum of (10.6Å and 15.6Å).

TABLE 1

| Major Lines in the X-ray Diffraction Pattern of ECR-1 | |
|---|---|
| dÅ | Intensity |
| 14.8 ± .2 | weak |
| 10.6 ± .2 | weak |
| 9.1 ± .2 | strong |
| 7.8 ± .2 | medium |
| 5.8 ± .2 | medium-weak |
| 4.22 ± .1 | medium |
| 3.72 ± .1 | medium |
| 3.67 ± .1 | strong |
| 3.57 ± .1 | medium |
| 3.48 ± .1 | v. strong |
| 3.16 ± .1 | v. strong |
| 3.06 ± .1 | medium |

TABLE 1-continued

| Major Lines in the X-ray Diffraction Pattern of ECR-1 | |
|---|---|
| dÅ | Intensity |
| 3.00 ± .1 | medium-weak |

Minor variations in the mole ratios of the oxides within the ranges given in the chemical composition do not substantially alter the structure or properties of the zeolite. The exchangeable cations which may partially or fully replace the cations found in the as-synthesized zeolite in a subsequent ion exchange method may be cations of metals from any one of Groups I to VIII of the Periodic Table or rare earth metals, depending on the end use desired. Preferably, the cations will be mono-, di- and trivalent metal cations, particularly from Groups I, II or III of the Periodic Table such as barium, calcium, cesium, lithium, magnesium, potassium, sodium, strontium, zinc, and the like, or hydrogen or ammonium or alkylammonium ions, or rare earth metals. The presence of these exchangeable cations will generally not cause a substantial alteration of the basic crystal structure of the zeolite. Particularly preferred are mono- and divalent cations, as they are more easily included in the pores of the zeolite crystal. Any ion exchange technique may be employed such as those discussed, for example, in U.S. Pat. No. 3,216,789. Such ion exchange is usually preceded by a calcination process to remove organic species trapped in the structure during synthesis.

A particularly preferred zeolite herein has a composition in terms of mole ratios of oxides in the range:

0.05 to 0.02 $R_2O$:0.95 to 0.98 $Na_2O$:$Al_2O_3$:5 to 10 $SiO_2$

A MAZ-MORite zeolite may be prepared by a process in which a reaction mixture, generally a slurry, is formed comprised of an oxide of sodium, water, a tetraalkylammonium salt as discussed above, a source of silica, a source of alumina and sodium zeolite (aluminosilicate) nucleating seeds. The oxide of sodium may be, e.g., sodium hydroxide, and the tetraalkylammonium salt may be a sulfate, nitrate, phosphate or halide salt, and is preferably a halide such as the chloride, iodide or bromide salt or a hydroxide. The silica is derived from preferably sodium silicate. The alumina may be derived from sources such as, e.g., alumina trihydrate, sodium aluminate, alum, kaolin, metakaolin or the like. It is noted that the sodium oxide may be provided not only directly by adding, e.g., sodium hydroxide to the mixture, but also indirectly from the source of silica and/or the source of alumina if, for example, sodium silicate and sodium aluminate (prepared by dissolving NaOH and $Al_2O_3.3H_2O$ in water) are respectively employed as at least one of the silica and alumina sources. The preferred source of alumina is an aluminum salt selected from the chloride, sulfate and nitrate salts.

The aluminosilicate nucleating seeds which are also required in the reaction mixture, also known as zeolite nucleation centers, consist of a slurry of zeolite solids having the following components: $SiO_2$, $Al_2O_3$, $Na_2O$ and $H_2O$. Generally, the seeds should have an average particle size less than about 0.1 microns. The composition of the nucleating seeds in the slurry may be in the approximate ranges, in terms of mole ratios of oxides, as follows:

4 to 30 $Na_2O$:1 to 9 $Al_2O_3$:3 to 30 $SiO_2$:250 to 2000 $H_2O$.

Such slurries of nucleating seeds may be prepared by the process disclosed in U.S. Pat. Nos. 3,433,589; 3,808,326; and 4,178,352, the disclosure of which are incorporated herein by reference. In general, the preparation procedure involves mixing appropriate amounts of sodium silicate, sodium aluminate and water together and aging the resulting slurry at about 0° to 90° C. for about 1 to 500 hours, with lower temperatures requiring a longer period of time. Preferably, the slurry is aged at ambient temperatures for about 20 to 400 hours and the zeolite centers have compositions in the range:

10 to 16 $Na_2O$:1 to 9 $Al_2O_3$:10 to 15 $SiO_2$:250 to 2000 $H_2O$.

The amount of nucleating seeds which must be present in the reaction mixture is expressed in terms of the percentage of the total molar alumina content in the zeolite slurry. Thus, for example, if 5 molar percent of the nucleating seeds is added to the mixture, the seeds are contributing 5% of the total molar amount of alumina in the zeolite slurry. In general, the seeds are present in an amount to yield 0.1 to 10 mole percent of the total alumina content of the slurry, and preferably 2 to 6 mole percent.

As an additional requirement, the relative amounts of ingredients in the reaction mixture will be such that the mixture will have a composition, in terms of mole ratios of oxides, within the following ranges:

| Oxide Constituents | Ranges of Mole Ratios |
| --- | --- |
| $R_2O$:$Al_2O_3$ | 0.2 to 1.0 |
| $Na_2O$:$Al_2O_3$ | 1.0 to 7 |
| $SiO_2$:$Al_2O_3$ | 5 to 20 |
| $H_2O$:$Al_2O_3$ | 120 to 300 |
| $R_2O$:$Na_2O$ | 0.05 to 0.4 | where R represents a tetraalkylammonium group as defined above.

In one preferred method of preparation a sodium silicate solution, a slurry of nucleating seeds and a bis-(2hydroxyethyl) dimethylammonium halide solution are added to a blender, followed by slow addition, with mixing, of a sodium aluminate solution and an alum solution. Then additional water is added to the resulting slurry. The reaction mixture is ordinarily prepared in a container made of glass, metal, teflon or the like which should be closed to prevent water loss.

After the reaction mixture is formed it is homogenized by thorough blending so as to be substantially homogeneous in texture. This step is to help insure that the zeolite product ultimately obtained is not a mixture of products. The mixing may take place in any vessel in which complete mixing can be effected.

The homogenized mixture is then placed in a reactor, ordinarily one which can withstand elevated pressures such as an autoclave or other pressure reactor, where it is maintained at a temperature of between about 120° and 200° C., preferably 150° and 180° C., and, for commercial purposes, preferably no greater than 200° C. The exact temperature will depend, for example, on the amount of sodium oxide present and the length of time employed for reaction. At temperatures much above about 200° C. the zeolites obtained are not commercially acceptable due to major crystallization of impurities. Below 100° C., faujasite is formed as a major product. The homogenized mixture is heated and maintained at autogenous pressures which will depend on the temperature employed. Lower pressures of 5 atm may be adequate for temperatures at the lower range but at higher temperatures up to 200° C., pressures of up to about 25 atm or higher may be achieved. The amount of time required for heating will depend mainly on the temperature employed, so that at 120° C. the heating may be carried out, e.g., for more than 12 days, whereas at, e.g., 160° C. or more the time period may be, e.g., 4 to 12 days. In any event the heating is carried out until crystals are formed of the zeolite product, i.e., MAZ-MORite having the following range of composition:

0.1 to 0.02 $R_2O$:0.90 to 0.98 $Na_2O$:$Al_2O_3$:5 to 20 $SiO_2$:$X H_2O$ where R and x are as defined above. The product zeolite MAZ-MORite is also characterized by having an x-ray powder diffraction pattern which is essentially the same as that shown in Table I above.

The crystallization time may be shortened, if desired, by seeding the slurry before or after the blending step with minor amounts of MAZ-MORite crystals of this invention, which are preferably crushed or chopped at temperatures of about 77° K. under liquid nitrogen for about 1 to 10 minutes before seeding to render them microcrystalline, e.g., less than about 0.1 microns.

The product zeolite crystals may be recovered by filtration from the reaction mixture. Typically they are washed, preferably with distilled water, to separate them from the mother liquor. The washing should continue, for best purity results, until the wash water, equilibrated with the product, has a pH of between about 9 and 12. After the washing step the zeolite crystals may be dried or calcined if removal of the trapped organic template is desired. Characteristically, the trapped dimethyldiethyl ammonium cation decomposes and evolves from MAZ-MORite at a temperature of between about 440° and 500° C. Decomposition and evolution of the same cation trapped in synthetic faujasite takes place between about 320° and 360° C. Tetraethylammonium (TMA) cations are decomposed and evolved from TMA-Z K4 at temperatures over 550° C.

The zeolite MAZ-MORite of this invention may be used as a sorbent or as a catalyst. To be employed for these applications, the zeolite may be at least partially dehydrated by drying at temperatures of up to about 500° C. or more until most or all of the water of hydration is removed along with the trapped organic cations.

The original cations can be replaced in accordance with techniques well-known in the art, at least in part, by ion exchange with other cations. Preferred replacing cations include metal ions, ammonium ions, hydrogen ions and mixtures thereto. Particularly preferred cations are those which render the zeolite intermediate composition catalytically active, especially for hydrocarbon conversion. These include hydrogen, rare earth metals, aluminum, manganese and metals of Groups II and VIII of the Periodic Table of the Elements.

The recent discovery that ECR-1 is a layer twin structure constructed by interconnecting sheets from the MAZZ1 TE (E. Galli, Crystal Structure Comm., 3, p. 339, (1974)) and MORDENITE (W. M. Meier, Zeit. Kristallogr., 115, p. 439, (1961)) structures also demonstrated that a new family of zeolite structures, designated herein as MAZ-MORites, can be synthesized. Some MAZ-MORite materials are characterized by having fixed numbers of these two basic structural units interconnected in ordered ways. Other members would have varying numbers of one layer interspersed among the other. An analogous subfamily of structures is based on interconnecting mordenite sheets with layers from the hypothetical structure proposed for zeolite "Omega". (Barrer and Villeger, Chem. Comm. 1969)

The structure of the synthetic zeolite ECR-1 is schematically illustrated in FIG. 1. It is an ordered layer-twin of the mazzite and mordenite structures, constructed by interposing 15.7Å thick sheets of mazzite gmelinite cages (marked Z in FIG. (1) between 10.6Å thick (26.3Å–15.7Å) layers of mordenite-type double 8-rings sheets (marked D). Both structural layers are well described by the two-sided plane group Pmmn, with a unit cell within the layer of approximate dimension 7.3Å by 18.2Å. These structural units precisely fit the space group symmetry and unit cell of ECR-1, which is Pmmn ($D_{2h}^{13}$, No. 59) with a=7.310(4)Å, b=18.144(6)Å and c=26.31(1)Å. The unit cell values were obtained from least-squares refinement of 45 well-defined peak positions in the range 7° to 45° $2\theta$ for FeK radiation ($\lambda$=1.9373Å). The presence of an n-glide symmetry operator normal to the 26Å C. axis was verified by the observation of systematic extinctions on some selected area electron diffraction patterns from the a*b* plane.

Despite the constraints of space group Pmmn symmetry and of the experimentally determined lattice constants, there are still two acceptable ways to interconnect the mazzite and mordenite layers in ECR-1. The layers can be interconnected through 5-ring chains (Model 1) reminiscent of the parent structures or through alternating 4,6-ring chains (Model 2). Refinement of either model using ideal distances adjusted to the optimum Si/Al ratio (~3 to 3.6) gives excellent agreement with observed lattice constants and symmetry constraints.

The discovery that ECR-1 is a layer-twin structure of mazzite and mordenite, constructed by interposing layers of one structure between those of the other, when combined with the fact that structural layers in the parent materials clearly bond to each other satisfactorily, shows that a new subfamily of zeolite structures can be synthesized. This subfamily will be called the MAZ-MORite materials and it will be characterized by having varying numbers of these two structural layers bonded to each other, either in ordered sequences that can be described crystallographically or in a more random fashion that might be described as syntactic intergrowth of the parent materials on a microscopic scale. An analogous subfamily of structures based on combining mordenite layers with layers from the proposed Omega structure while fully satisfying the constraints of tetrahedral three-dimensional network bonding can also be described. Although it is possible to conceive of orderings involving large numbers of the two layers, only structures up to double mordenite double mazzite/Omega layers will be considered in detail here. It may also be a characteristic of this group of MAZ-MORites that they always include two or more species as intimate intergrowths, or that they grow intimately with ECR-1 and/or mazzite (i.e. ZSM-4 or Omega), and/or mordenite.

A few general comments can be made about the crystallography of the structures that will occur in these layer-twin materials. First, the ideal symmetry of the materials will be orthorhombic. Second, all structures will have two lattice constants describing the repeat within the structural layers with values essentially identical to the 7.3Å a and 18.1Å b axes observed in ECR-1. Third, if these two repeats are adopted as the a and b axes of the structures, the ideal symmetry normal to each axis will be m, so that the diffraction symbol for all materials discussed here, sans the unit cell type, is mm*; the unit cell type, either primitive or centered, will depend on the structure. Finally, the c axis lengths, describing the ordering normal to the layers, will be combinations of the thicknesses in the structural sheets. After consideration of layer thicknesses in the parent structures and in the structure of ECR-1, its seems reasonable to choose a thickness of 10.6Å for mordenite sheets and 15.6Å for mazzite and for "Omega" structural layers. The primitive repeat is computed by summing these distances in proportion to the number of layers of each type in the structure, although unit cell centering may result in doubling of the final value in order to maintain conventional crystallographic descriptions of the materials.

Figure 5:
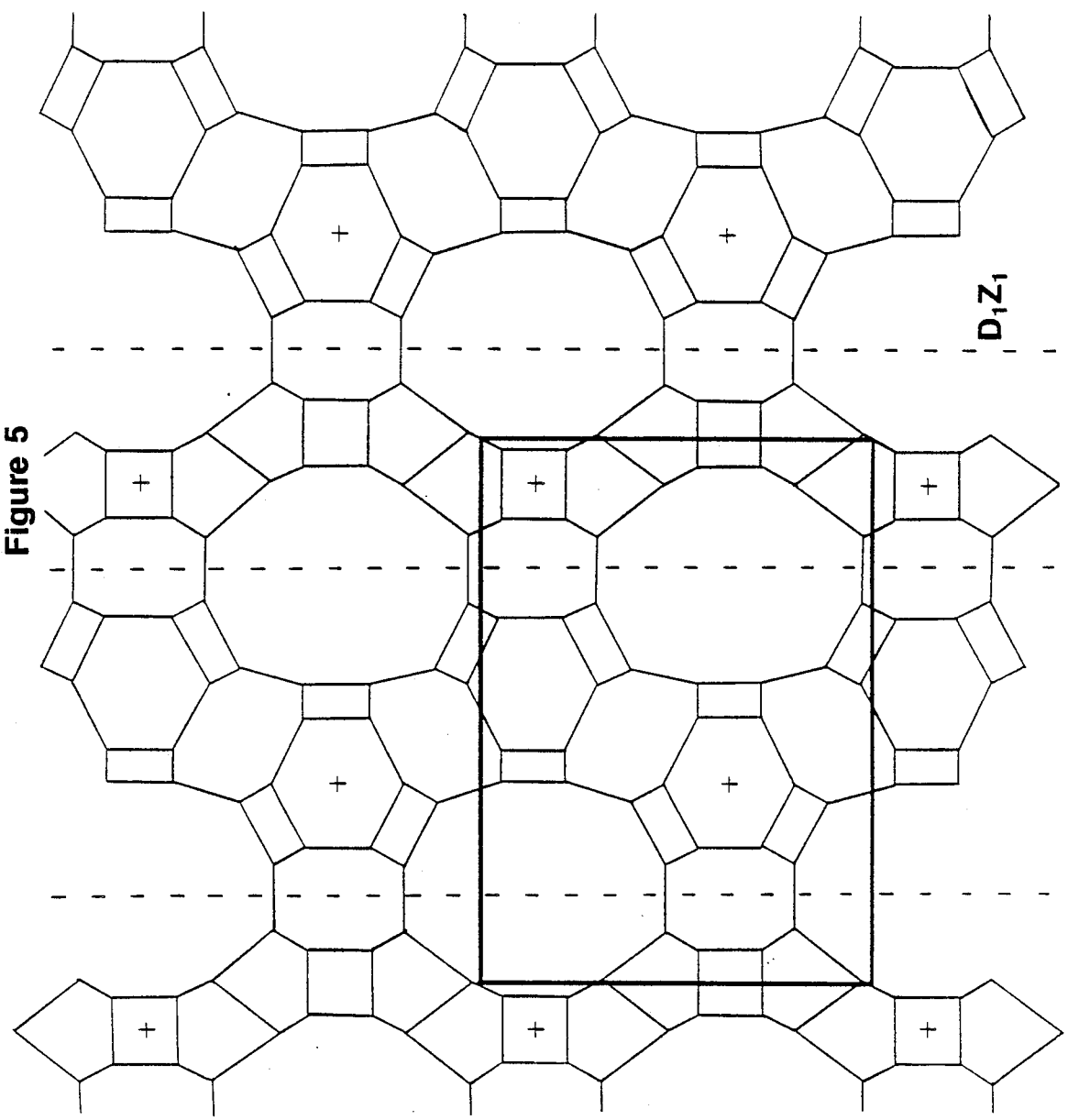
FIG. 5 Schematic representation of structure $D_1Z_1$ viewed along the a direction.
Figure 6:
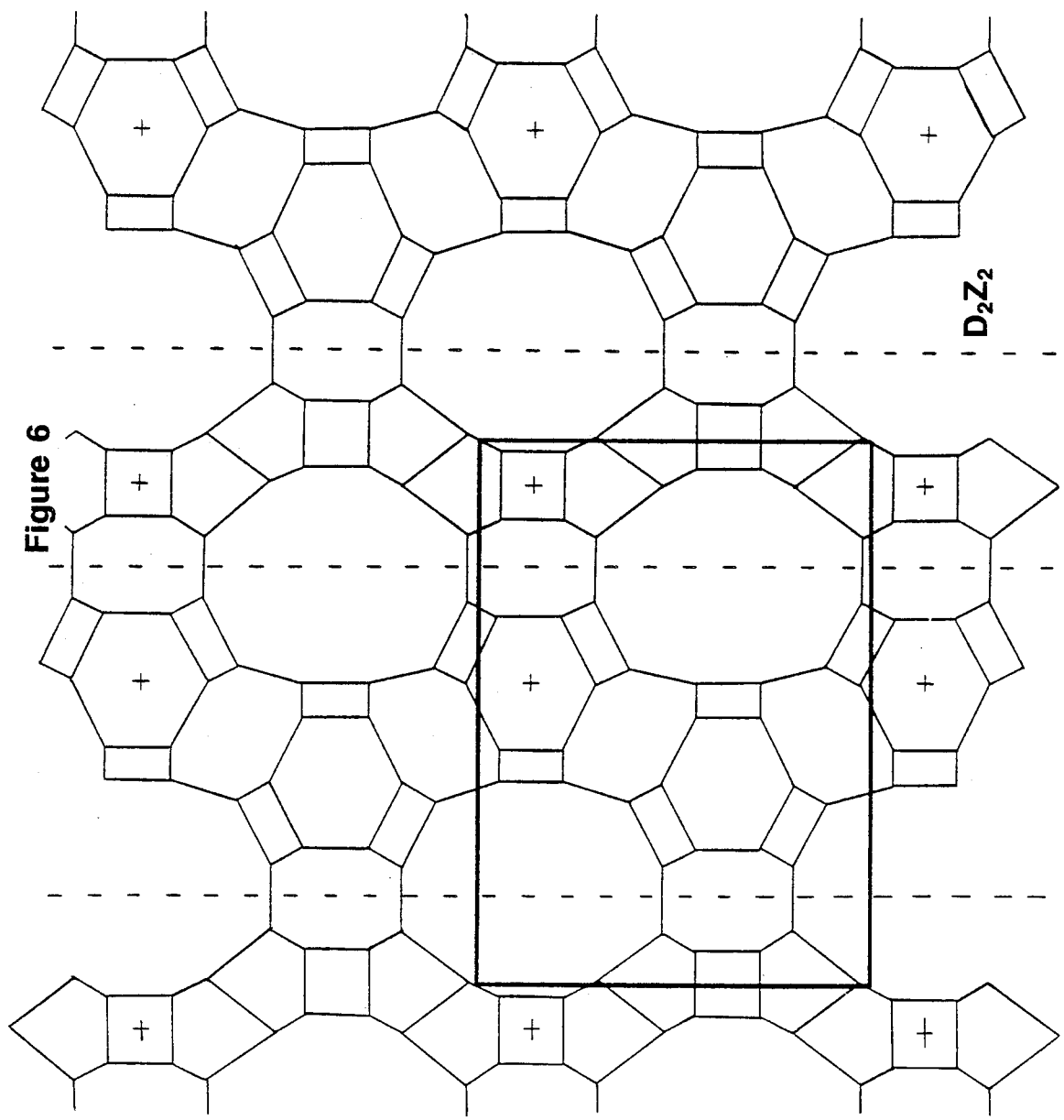
FIG. 6 Schematic representation of structure $D_2Z_2$ viewed along the a direction.
Figure 7:
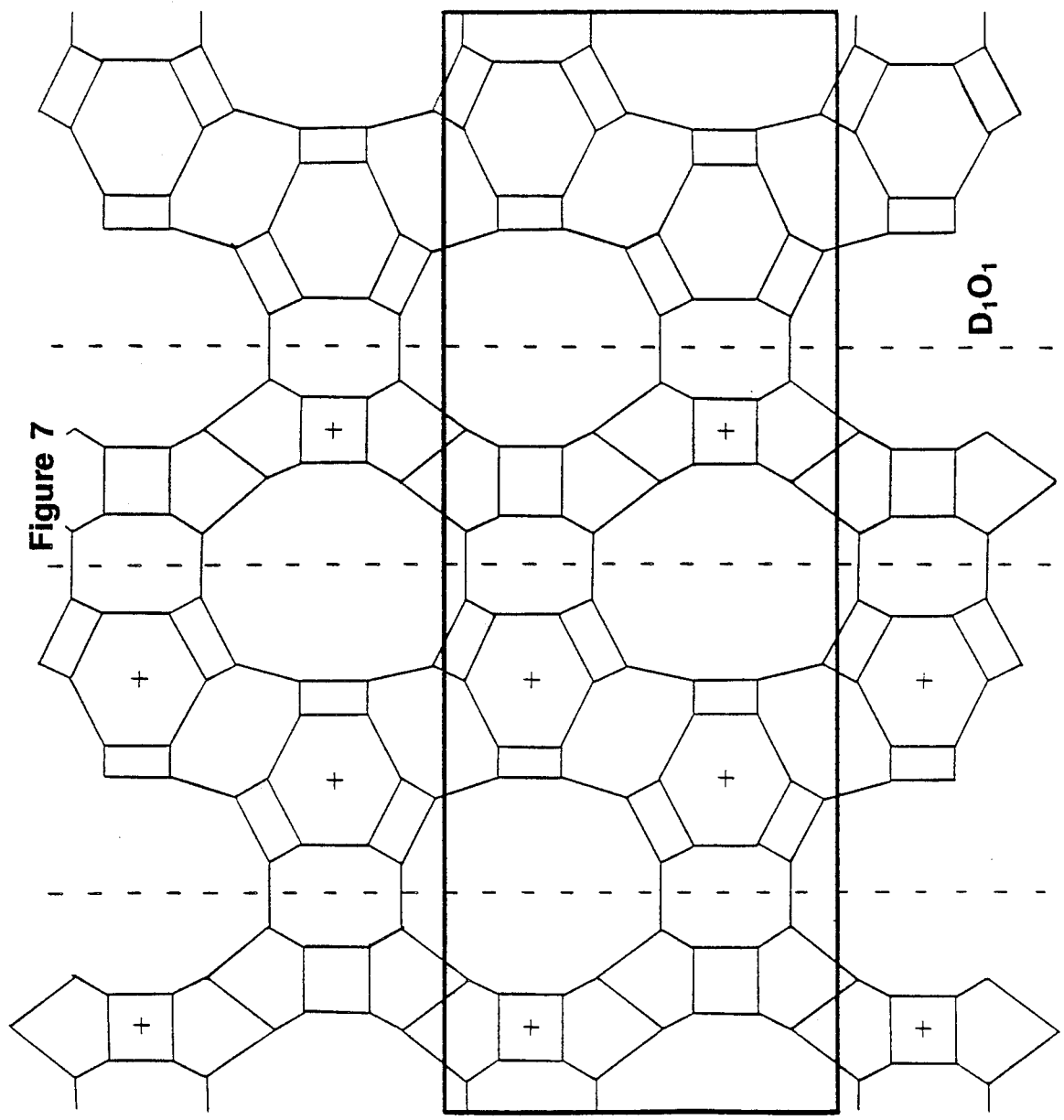
FIG. 7 Schematic representation of structure $D_1O_1$ viewed along the a direction.
Figure 8:
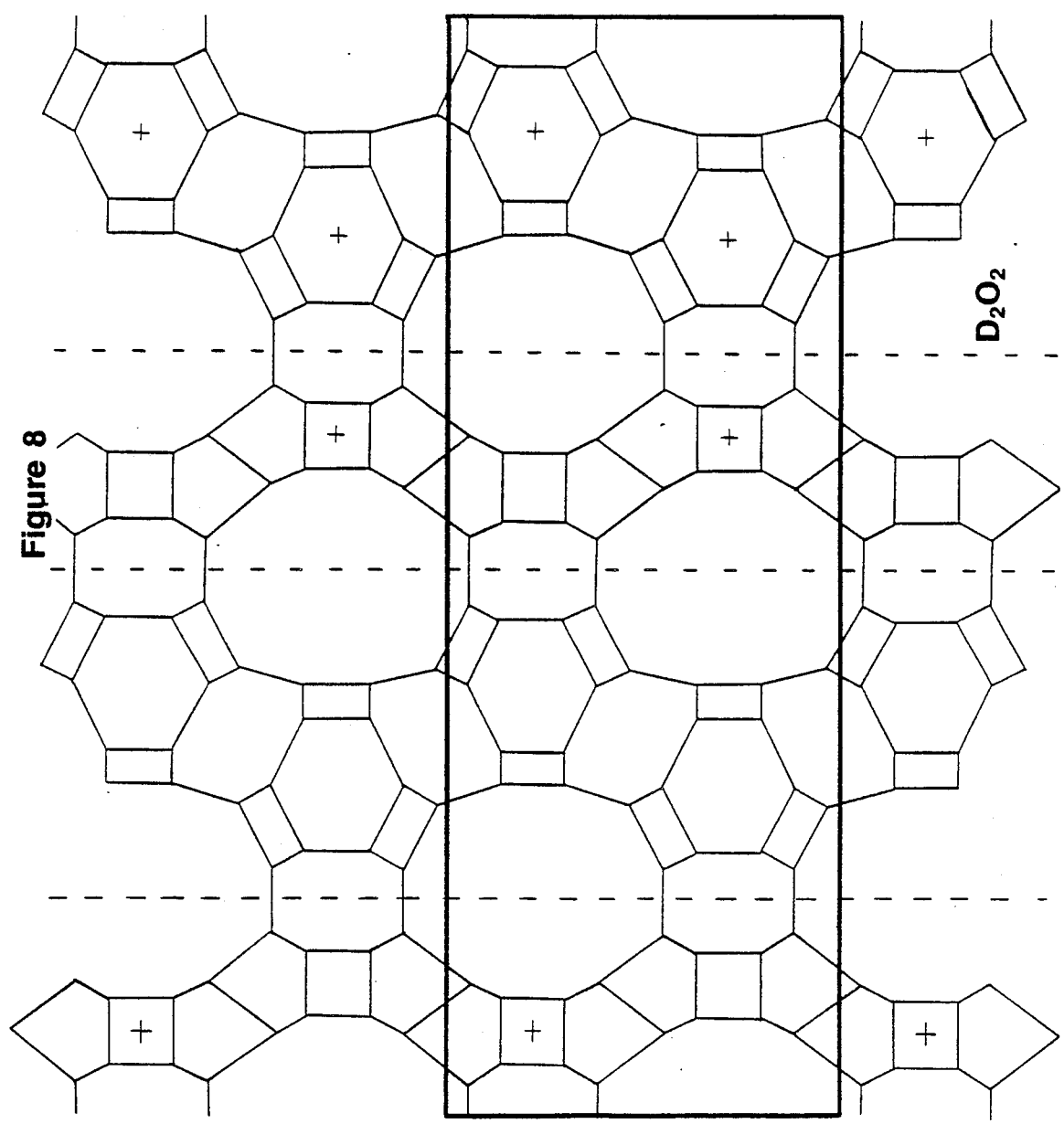
FIG. 8 Schematic representation of structure $D_2O_2$ viewed along the a direction.

The next step in the analysis is to invent a nomenclature to describe the variety of structures that will occur among these materials. As was indicated in FIG. 1, the letter D will be used to signify a 10.6Å thick sheet of mordenite double 8-rings and the letter Z will indicate a 15.6Å thick mazzite sheet of gmelinite cage columns. The letter O will be used to indicate a 15.6Å thick "Omega" sheet of gmelinite cage columns. Since there were two acceptable connectivities between layers in the ECR-1 structure, the subscripts 1 and 2 will be adopted to indicate 5-ring chains (Model 1) and alternating 4,6-ring chains (Model 2) respectively between layers. Thus, the sequence of layers for ECR-1 Model 1 would be $D_1Z_1D_1Z_1$... or simply $D_1Z_1$ and ECR-1 Model 2 would be described as $D_2Z_2$. These structures are schematically illustrated in FIGS. 5 and 6. Corresponding structures in mordenite/"Omega" subfamily, $D_1O_1$ and $D_2O_2$, are illustrated in FIG. 7 and 8. In these four figures, as in the ones to follow, the structure is viewed along the 7.3Å a axis with dashed lines indicating boundaries between structural layers. The unit cell is indicated (the b axis is parallel to the sheets and the c axis is normal to it) and the relative heights of subunits within and between the layers is indicated by the plus (+) signs. For example, the sequence of double 8-rings within a mordenite sheet along the b direction would be indicated by marking alternate ones with a plus (+) sign, because these entities are shifted by a/2 relative to each other along the sheet. The same indication would be made for columns of gmelinite cages within the mazzite sheet. The "Omega" structural layer is not characterized by such alternation in the a direction and hence either all or none of the gmelinite cage columns within its structural layer would be so indicated. The plus (+) signs also indicate the type of connectivity between structural layers, because the difference between type 1 (5-ring) and type 2 (4,6-ring) connectivity is the relative heights of the layers in the a direction. The criterion for using the plus sign indication is the relative positions of the 8-ring openings in both the mordenite and mazzite/"Omega" sheets. If these 8-rings are aligned in the c direction at the point where the layers are bonded, the subunits are considered to be at the same height in the a direction and either both or neither would be indicated by the plus (+) sign. The alignment of 8-ring openings across the interlayer boundary is type 2 connectivity. Type 1 connectivity results in 8-ring openings shifted by a/2 relative to each other across the boundary, and, in drawings of these structures, either one or the other of the subunits bonding across the boundary between layers would be indicated by the plus (+) sign.

Before moving from the double layer structures characterized by simple alternation of mordenite and mazzite/Omega layers into the triple and quadruple layer structures, it is useful to consider restrictions on interlayer connectivity based on those observed in the parent materials. In particular, only Type 1 connectivity is observed between layers in mordenite, which would be described in this nomenclature as $D_1D_1D_1D_1$... or simply $D_1D_1$. Hence, only $D_1D$ structures will be considered here. Similarly, the native structure of mazzite is described here as $Z_1Z_1$ in this nomenclature and only $Z_1Z$ structure possibilities will be considered. Finally, the proposed structure for zeolite "Omega" is described as $O_2O_2$, so only $O_2O$ possibilities will be considered. While we will not specifically consider orderings of $D_2D$ and $Z2Z$, it should be noted that these orderings would involve the alignment of 8-ring openings across the boundaries between the layers. These orderings have not yet been observed in the native materials, but precedent for alignment of 8-ring openings is found in ECR-1 [Model 2]. Thus, it may indeed be possible to construct similar orderings of DD and ZZ sheets. This would imply the existence of new 'mordenite-like' and "mazzite-like" phases and intergrowths between them.

Figure 9:
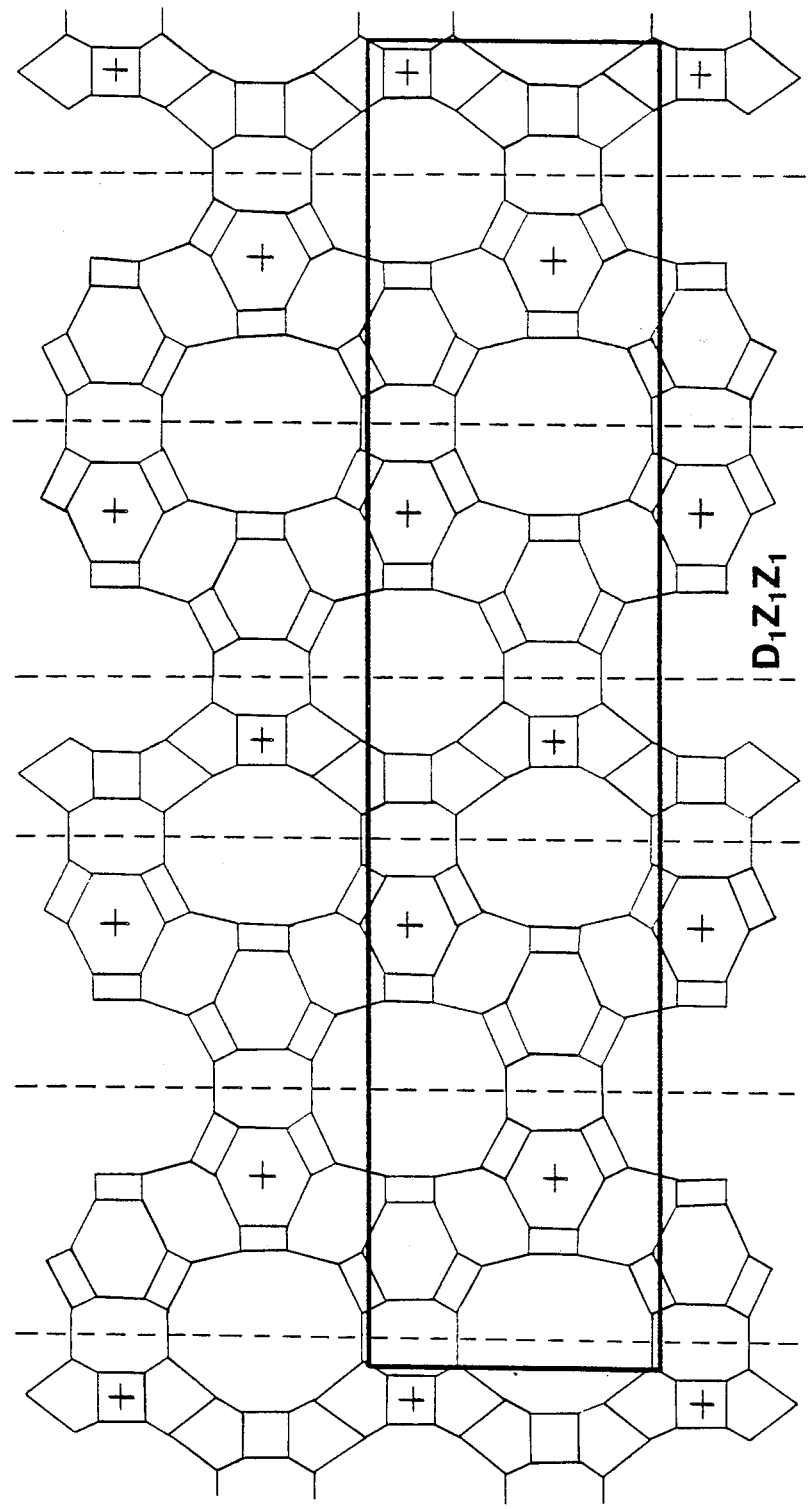
FIG. 9 Schematic representation of structure $D_1Z_1Z_1$ viewed along the a direction.
Figure 11:
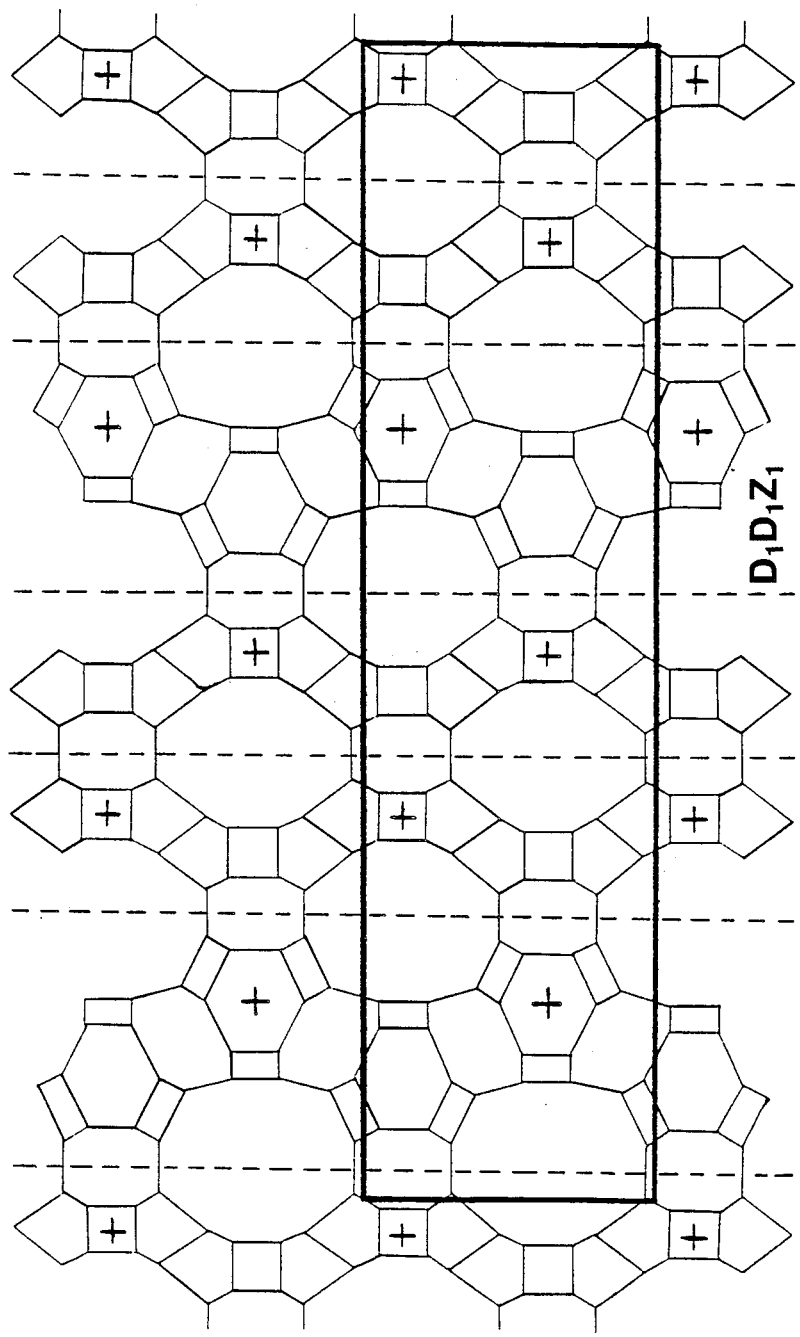
FIG. 11 Schematic representation of structure $D_1D_1Z_1$ viewed along the a direction.
Figure 12:
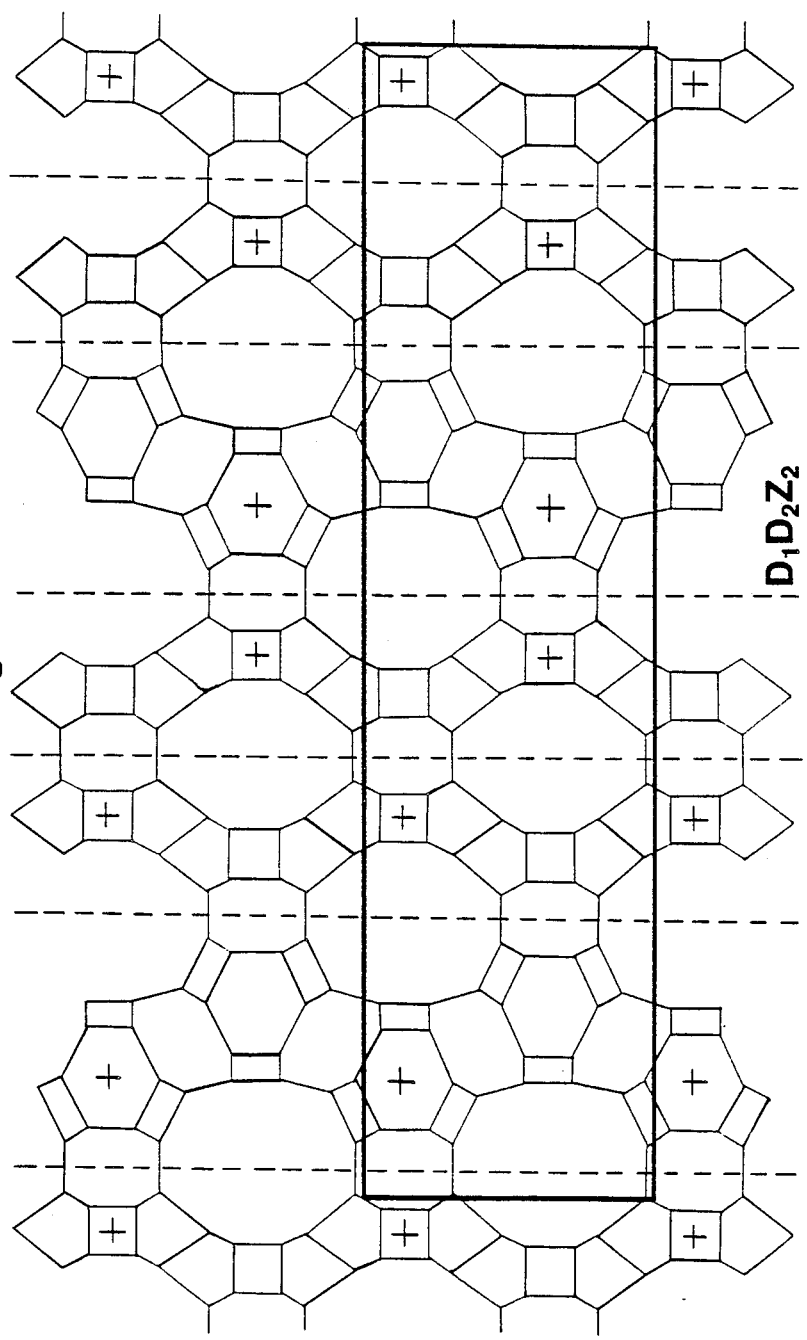
FIG. 12 Schematic representation of structure $D_1D_2Z_2$ viewed along the a direction.
Figure 13:
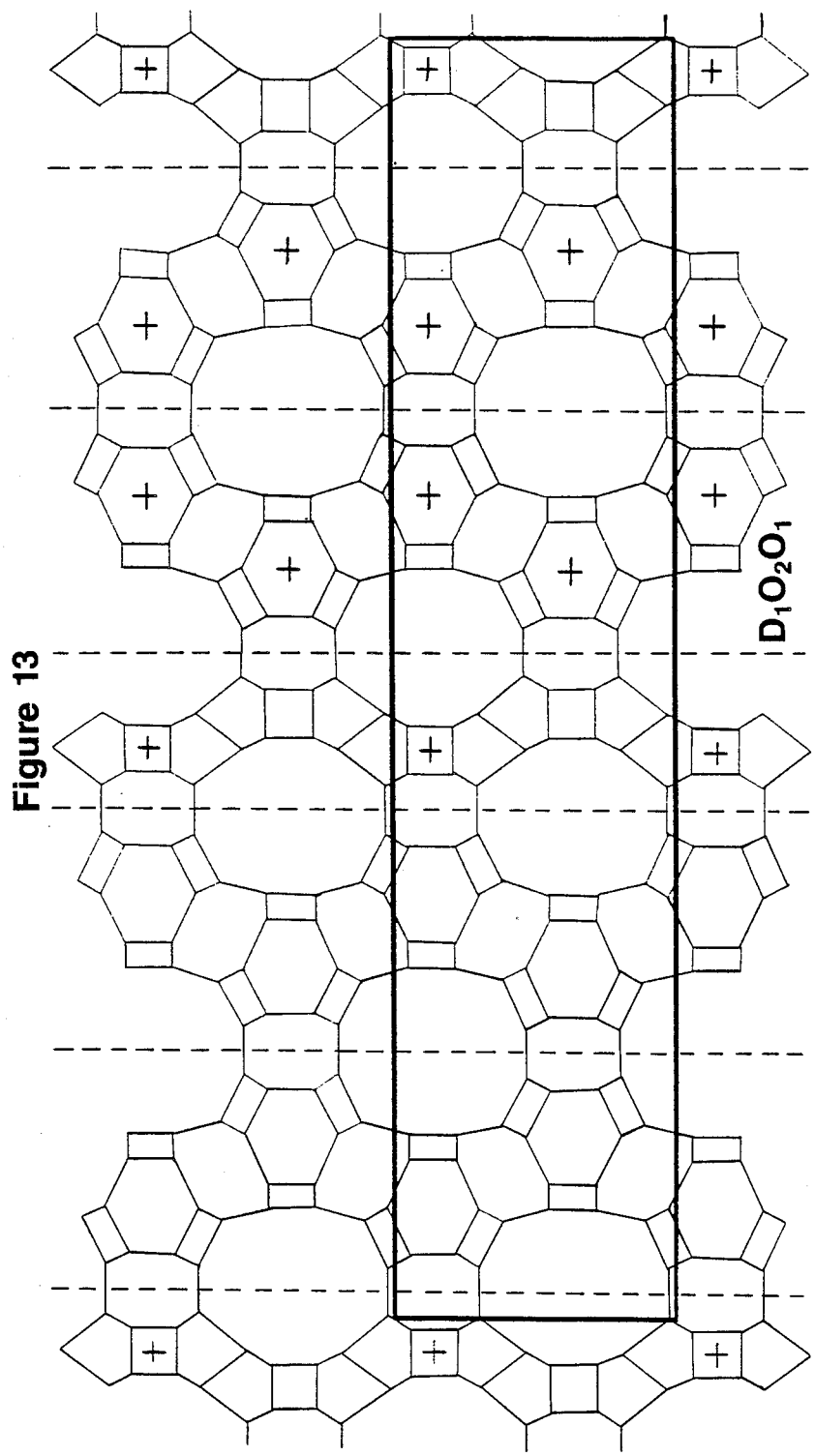
FIG. 13 Schematic representation of structure $D_1O_2O_1$ viewed along the a direction.
Figure 14:
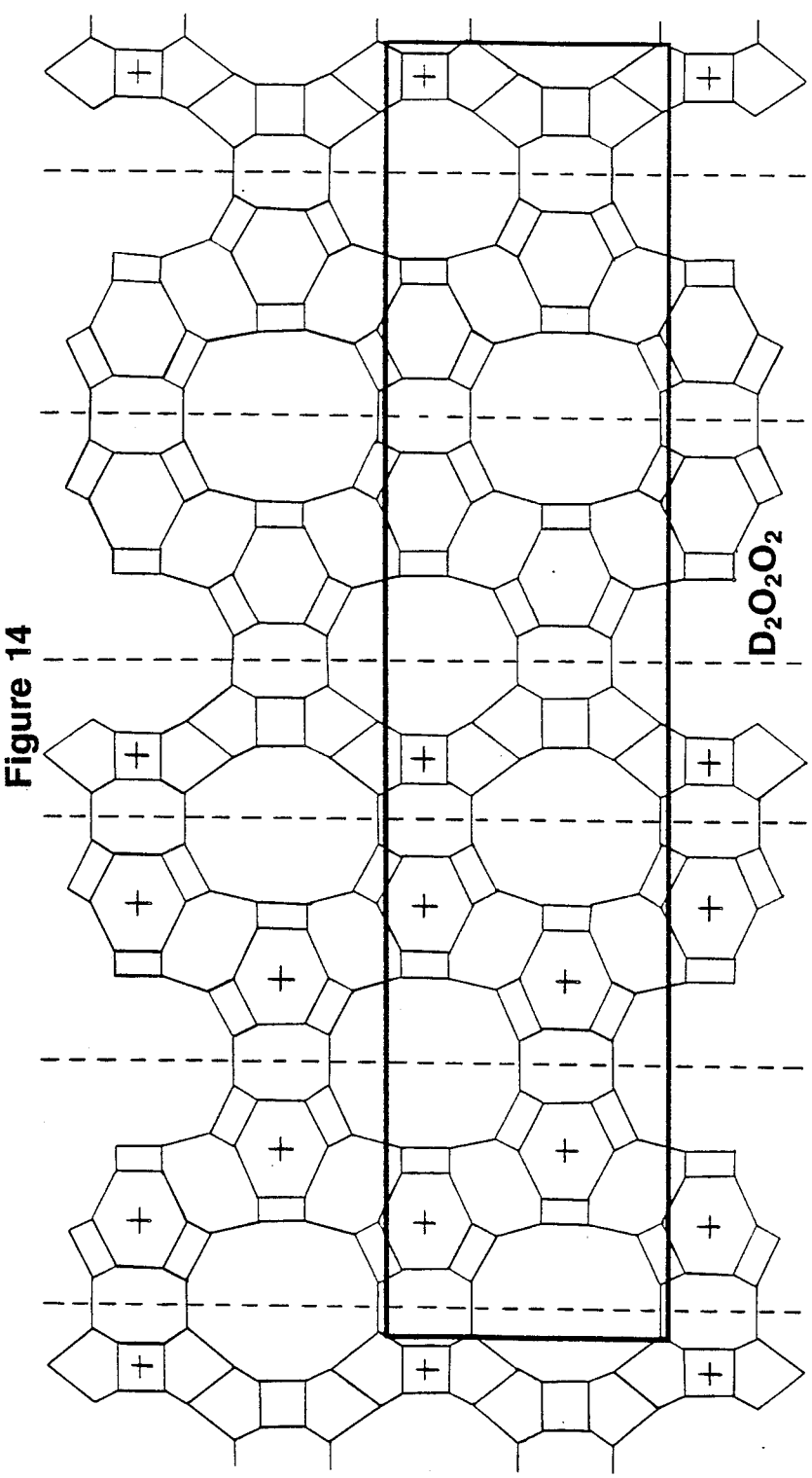
FIG. 14 Schematic representation of structure $D_2O_2O_2$ viewed along the a direction.
Figure 15:
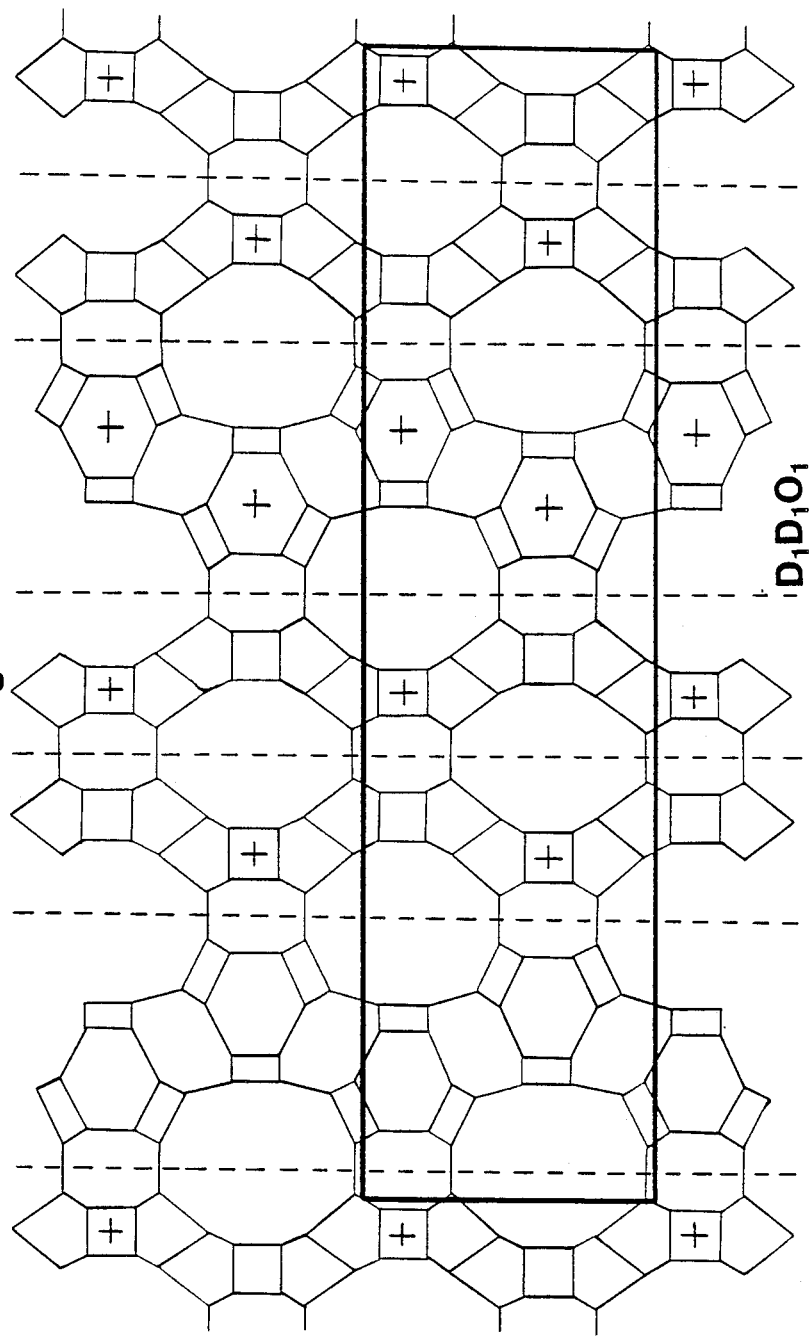
FIG. 15 Schematic representation of structure $D_1D_1O_1$ viewed along the a direction.
Figure 16:
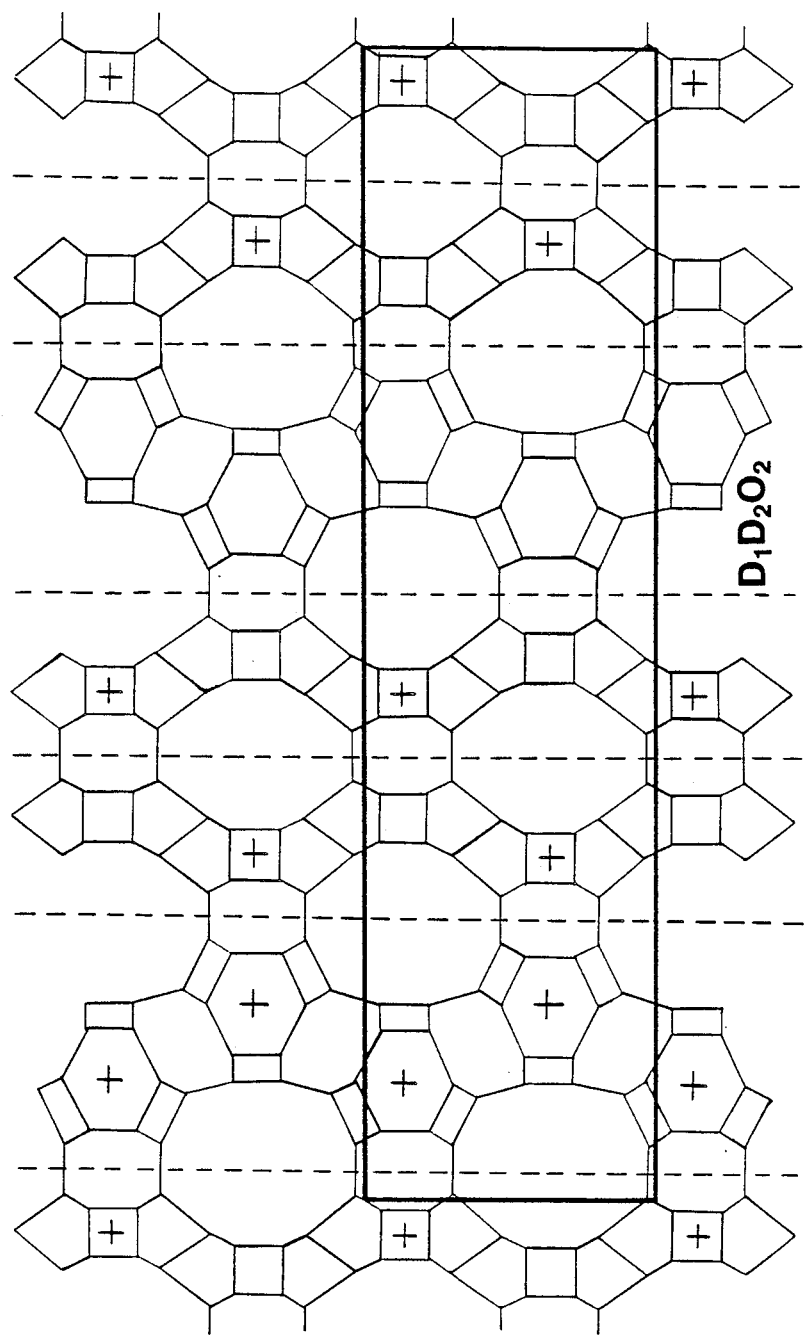
FIG. 16 Schematic representation of structure $D_1D_2O_2$ viewed along the a direction.
Figure 17:
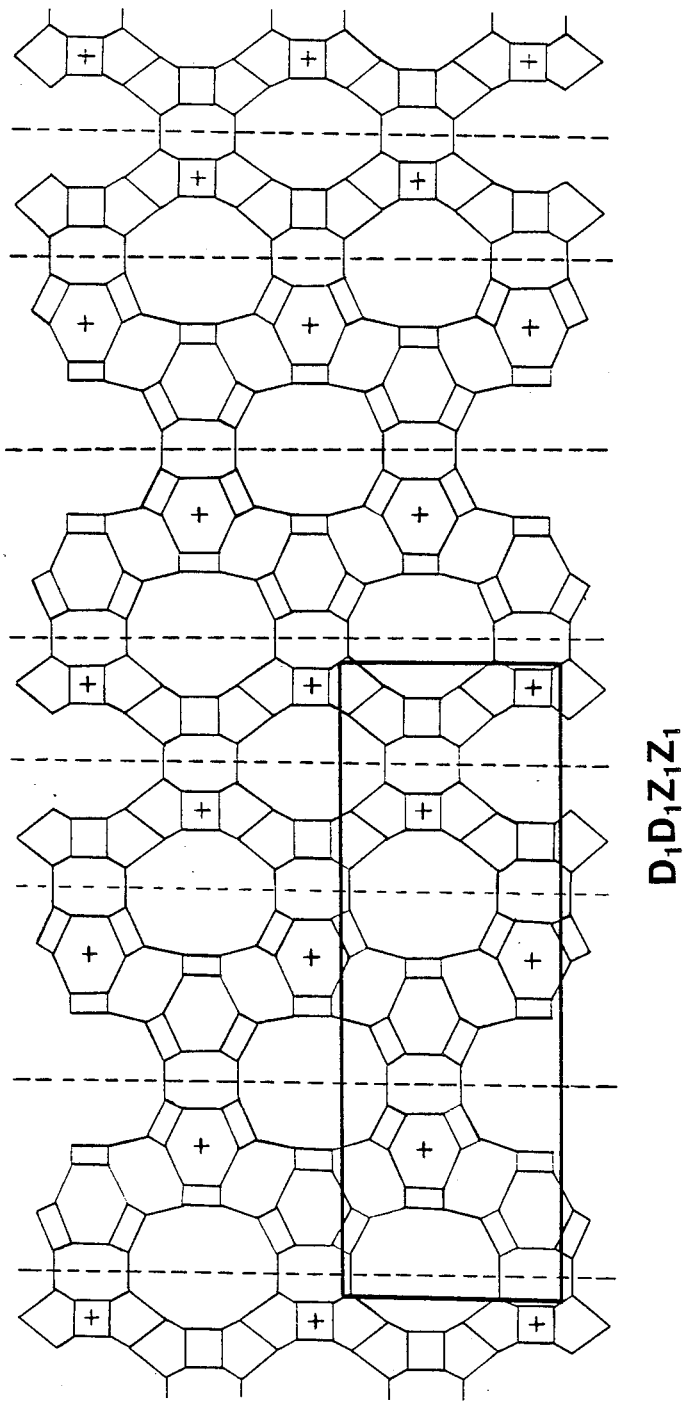
FIG. 17 Schematic representation of structure $D_1D_1Z_1Z_1$ viewed along the a direction.
Figure 18:
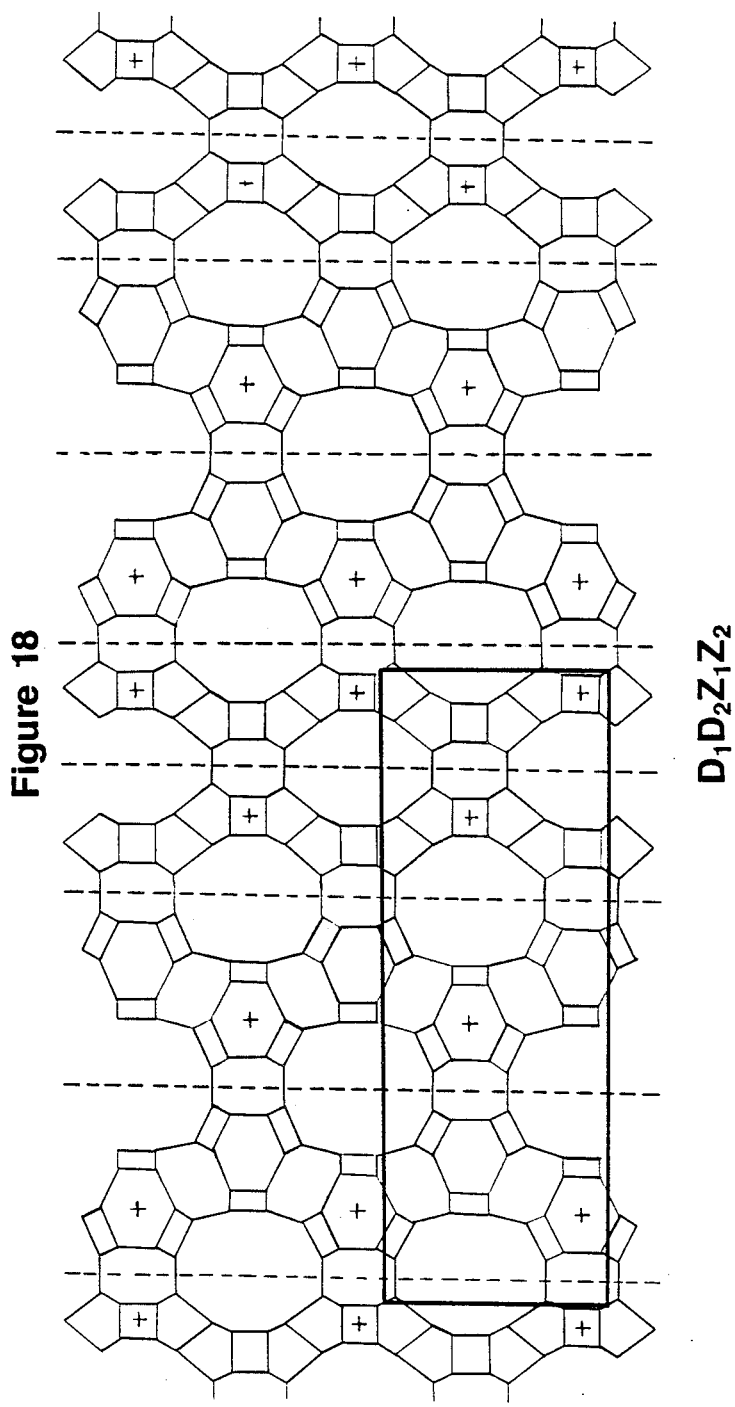
FIG. 18 Schematic representation of structure $D_1D_2Z_1Z_2$ viewed along the a direction.
Figure 19:
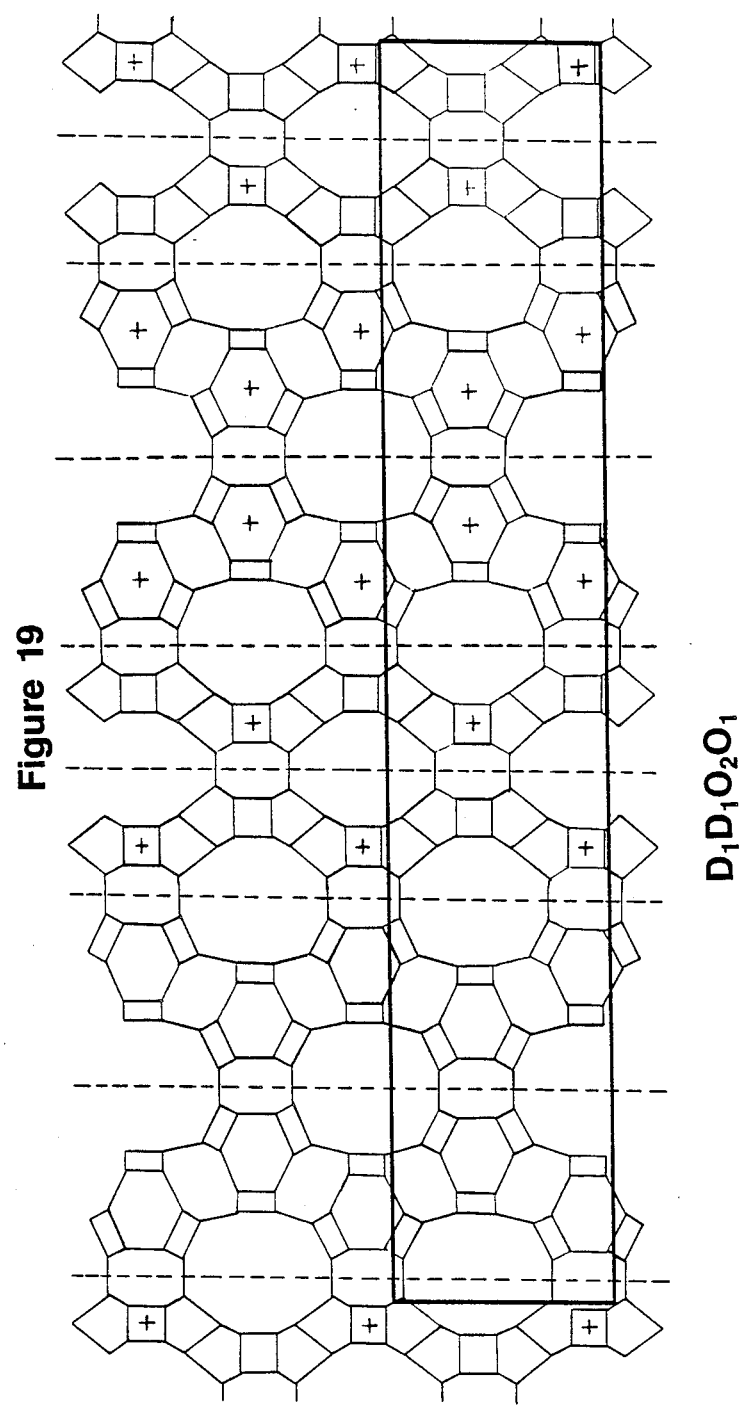
FIG. 19 Schematic representation of structure $D_1D_1O_2O_1$ viewed along the a direction.
Figure 20:
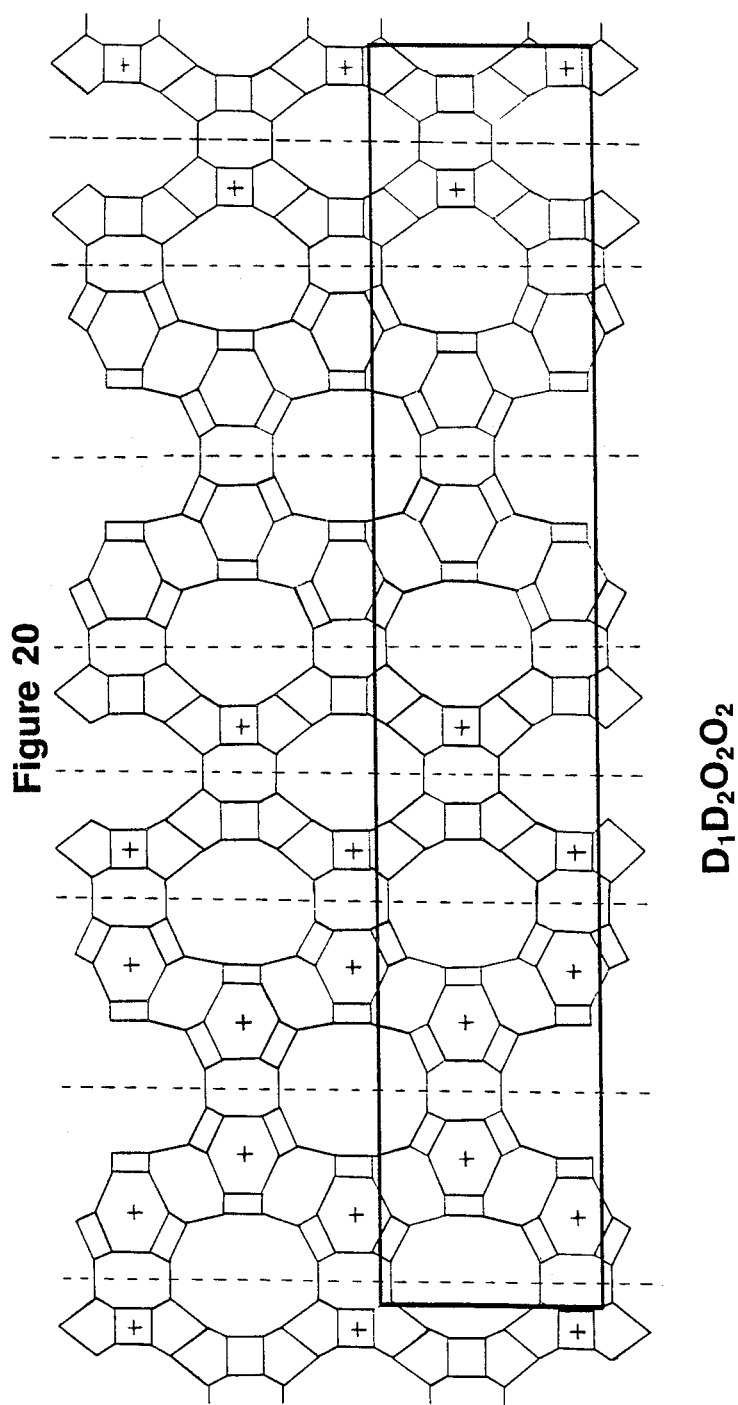
FIG. 20 Schematic representation of structure $D_1D_2O_2O_2$ viewed along the a direction.

There are four possible structures of three mordenite and mazzite sheets using the restrictions cited above and another four structures in the three layer mordenite/'-'Omega" subfamily. Using one mordenite sheet and two mazzite sheets, the possibilities are $D_1Z_1Z_1$, indicated in FIG. 9, and $D_2Z_1Z_2$, depicted in FIG. 10. With two mordenite sheets and one mazzite sheet, the possible structures are $D_1D_1Z_1$, shown in FIG. 11, and $D_1D_2Z_2$, illustrated in FIG. 12. The corresponding structures in the mordenite/"Omega" subfamily are $D_1O_2O_1$ (FIG. 13), $D_2O_2O_2$ (FIG. 14), $D_1D_1O_1$ (FIG. 15) and $D_1D_2O_2$ (FIG. 16). In the double mordenite -double mazzite/Omega group of structures, there are two possible DDZZ structures, $D_1D_1Z_1Z_1$ (FIG. 17) and $D_1D_2Z_1Z_2$ (FIG. 18) and two DDOO structures, $D_1D_1O_2O_1$ (FIG. 19) and $D_1D_2O_2O_2$ (FIG. 20). Crystallographic information of these structures is given in Table I.

Finally, the possibility that materials might be synthesized with varying numbers of layers of either the DZ or DO type should be considered. Since DD connectivity produces mordenite channels between layers, ZZ produces mazzite channels between layers and DZ produces ECR-1 type channels between layers, the synthesis of materials with these suborderings interspersed throughout the crystal would allow, in principle, the production of catalysts designed with specific ratios of the channel types within them. Analogous statements can be made about the DO structures.

Unit cell dimension, as such expression is utilized herein, is used in the conventional sense, as understood by those skilled in the art and may be determined by electron or X-ray diffraction analyses, as described, for example, in "X-ray Diffraction Procedures" by H. P. Klug and L. E. Alexander, John Wiley & Sons, 1954 and in "Interpretation of Electron Diffraction Patterns" by K. W. Andrews, D. J. Dyson and S. R. Keown, Plenum Press 1967. As described in these references, sufficiently small single crystals so as to afford penetration of the electron beam are aligned to yield reflections. The analysis of these electron diffraction patterns of single crystals will give the lattice parameters a, b and c. Recent developments in electron microscopy have evolved the technique known as "lattice imaging" as a particularly powerful and useful method for distinguishing between the different structures described here.

Lattice imaging of crystalline samples in an electron microscope provides information about the structure of materials, as explained, for example, in relevant sections of "Experimental High-resolution Electron Microscopy" by J. C. H. Spence, Clarendon Press, 1981 and "Introduction to Analytical Electron Microscopy" edited by J. J. Hren, J. I. Goldstein and D. C. Joy, Plenum Press, 1979. Diffracted electron beams from an oriented crystalline sample are recombined by the electron microscope lens system to provide a picture of the periodic structure of the material. Atomic scale interpretation of lattice images is often hampered by specimen thickness and microscope lens aberration effects that require computer simulation for the extraction of precise information. However, this technique is particularly sensitive to changes (called defects) in the periodic orderings of crystalline samples and such changes can be directly observed and understood in lattice images without the aid of computer simulation (see, for example, "Electron Microscopy of Defects and Disorder in Ba $Ga_{12}O_{19}$", T. Wagner and M. O'Keeffe, Acta Cryst 1985, B41, 108; "The Nanostructure of Heterogeneous Catalysts", J. M. Thomas, D. A. Jefferson and G. R. Millward, JEOL News 1985, 23E, 7; "The Structure of Zeolite CSZ-1 Interpreted as a Rhombohedrally Distorted Variant of the Faujasite Framework", M. M. J. Treacy, J. M. Newsam, R. A. Beyerlein, M. E. Leonowicz and D. E. W. Vaughan, J. Chem. Soc. Chem. Commun. 1986, 1211.). Thus, lattice imaging results can provide strong evidence for the differing orderings of layers that are a characteristic of a family of materials interrelated by layer twinning.

The question arises as to how these materials may be identified in syntheses products. The complexity of the structures precludes defining a set of peak positions and intensities characteristic of the X ray powder patterns of the family as a whole. Indeed, even the very presence of various hkl reflections, in principle the reflections least sensitive to changes in orderings between the layers, varies considerably among the structure types. Furthermore, the hko reflections will be few in number as compared with the multitude of other reflections caused by the differing but characteristically large c axis repeat distances of the family. Atomic framework models could be used to calculate peak positions and intensities for each structure, from which a set of intense reflections characteristic of that framework might be defined, but such calculations cannot a priori include the zeolite channel contents and these cations and water molecules radically affect the intensities of various peaks in empirically unpredictable ways.

An alternative to the traditional JCPDS position/intensity identification method is advocated by the National Bureau of Standards in Gaithersburg, Md.; it involves the use of lattice constants and symmetry as fiducial data for the identification of crystalline materials and a database (Crystal Data) of comparable size and completeness with that of the JCPDS powder data file is available for this purpose (see, for example, "NBS Lattice, a Program to Analyze Lattice Relationships", NBS Crystal Data Center, Reactor Radiation Division, National Bureau of Standards, Gaithersburg, Md., 1985). Thus, this family of materials can be identified in syntheses products once the unit cells and probable symmetries of those products are determined, either through computerized indexing of the X ray powder patterns or through electron diffraction experiments, for example. In the rare cases where ambiguity might arise, more advanced structural tools such as calculated patterns or lattice imaging could be employed. It is unlikely that materials outside this family will precisely match the lattice constants, symmetry, chemical composition and other physical properties of these materials, especially since a rather complex atomic ordering is needed to produce the large c axis repeat distances of this family. The MAZ-MORite may therefore be characterized as having orthohombic symmetry with a=7.3 (+0.2), b=18.1(+0.3) and c axes and lattice types as shown in Table 2.

Experiments to make these structures have been made in the general reactant composition range:

$AM_{2/N}O:BR_2O:Al_2O_3:X SiO_2:Y H_2O$.

where M is one or more cations of groups 1A and 2A of the periodic table of elements, an N their valence. R is an alkylammonium cation, characteristically bis(2-hydroxy ethyl)dimethyl ammonium ($E_2M_2$), bis(2 hydroxypropyl) dimethyl ammonium ($P_2M_2$), tri(2 hydroxyethyl) methyl ammonium ($E_3M$), (2-hydroxy ethyl) trimethyl ammonium ($EM_3$). 'A' is 1 to 3, 'B' is 0.4 to 2.0, 'x' is 5 to 20 and 'Y' is 100 to 300.

EXAMPLE 1

To a 1.25 litre blender were added, with mixing, 115.2gm. colloidal $SiO_2$(Ludox HS-40, DuPont Co.), 13.7gm. of a seed solution having a composition 13.3 $Na_2O:Al_2O_3:12.5SiO_2:267H_2O$, 146.8 gm. bis(2-hydroxypropyl dimethyl) ammonium iodide(50% aq. soln.), and 0.73 gm. mazzite seed crystals (1% on an $Al_2O_3$ basis). A sodium aluminate solution (14.5 gm. NaOH+16.18 gm. $Al_2O_3$ dissolved in 30 gm. $H_2O$) was added, together with sufficient water to give a total batch weight of 374 gm. After thorough mixing the gel was reacted at 150° C. in a stainless steel autoclave for 8 days. After removing and preparing the products for analysis, the material gave an x-ray diffraction pattern characteristic of that shown in Table 1 hereof.

Figure 10:
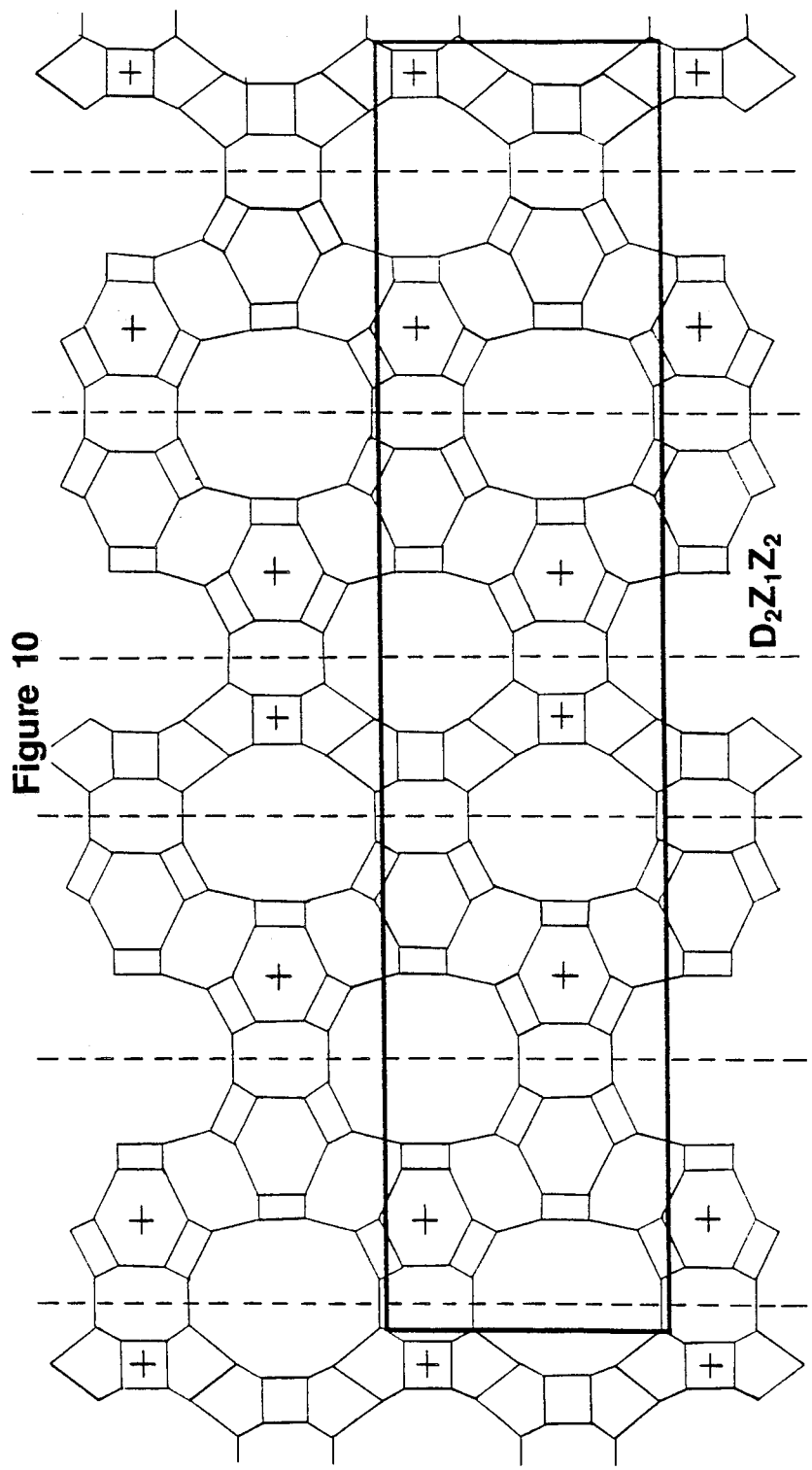
FIG. 10 Schematic representation of structure $D_2Z_1Z_2$ viewed along the a direction.
Figure 21:
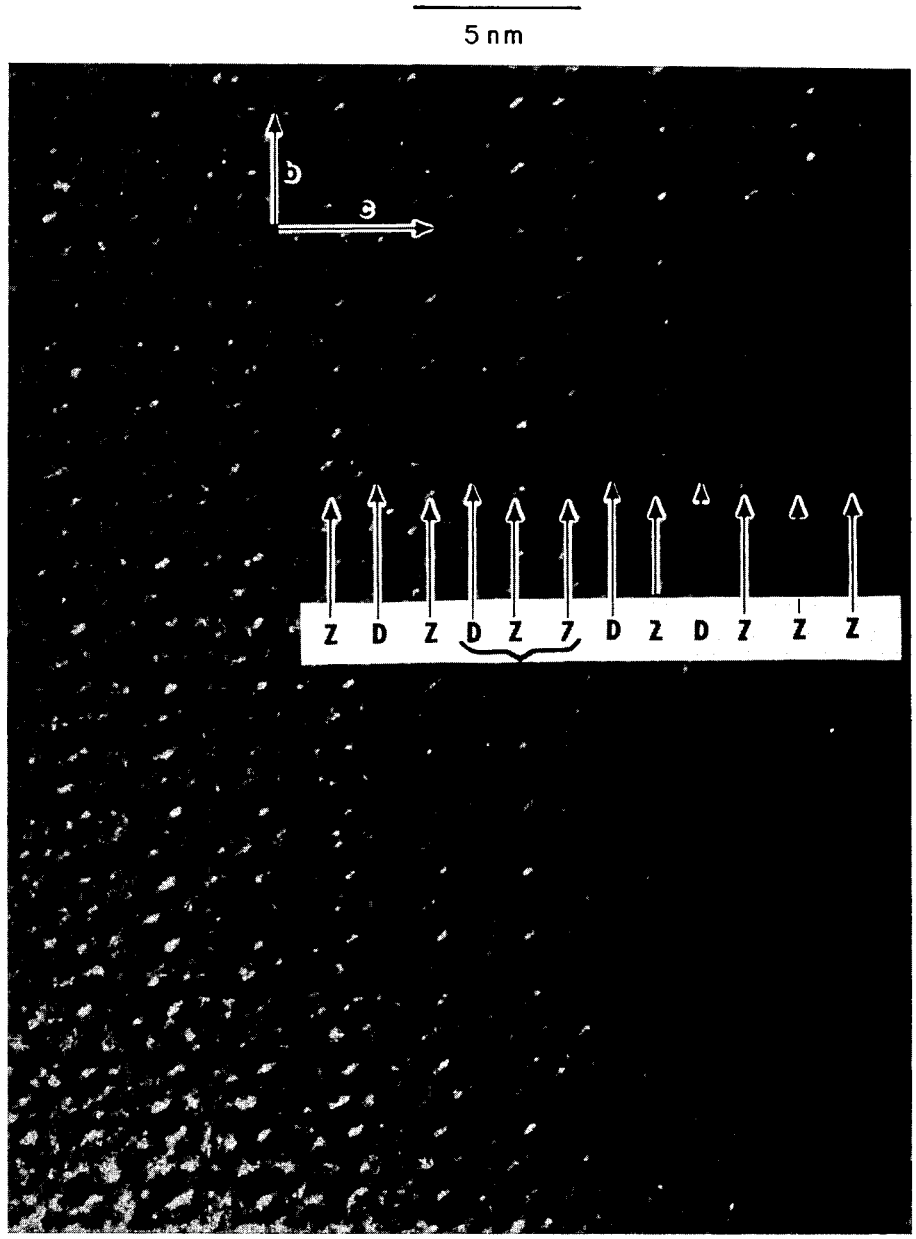
FIG. 21 HRTEM lattice image of the ECR-1 b*c* plane showing syntactic intergrowth with mazzite. Mordenite layers are indicated by D and mazzite by Z. The sequence ZDZZD observed in the micrograph is indicative of MAZ-MORite ordering of the structure-type $D_2Z_1Z_2$.

FIG. 21 is a HRTEM lattice image of the $b^*c^*$ plane of a crystal from this preparation. As indicated in this figure, which represents mainly an ECR-1 crystal, the sequence of layers DZZ occurs at one point in this example of syntactic intergrowth between ECR-1 and mazzite, the sequence being preceded by a layer of Z and followed by a layer of D; thus, the overall sequence is ZDZZD. This is the basis sequence in two possible MAZ-MORite structures, $D_1Z_1Z_1$ (FIG 9) and $D_2Z_1Z_2$ (FIG. 10). While the formal crystallographic unit cells for these structures are A-centered with the result that the cells contain six layers in the sequence DZZDZZ, the fundamental defining sequence for these structures is DZZ, preceded by Z and followed by D and this is the sequence observed in this micrograph. It can be said, then, that the MAZ-MORite structure type DZZ has been observed in this preparation, albeit in very small amounts. Furthermore, if the ECR-1 structure has 4,6-ring connectivity (type 2) between mordenite and mazzite sheets, this micrograph illustrates a direct observation of the MAZ-MORite structure type $D_2Z_1Z_2$.

Example 2

Figure 2:
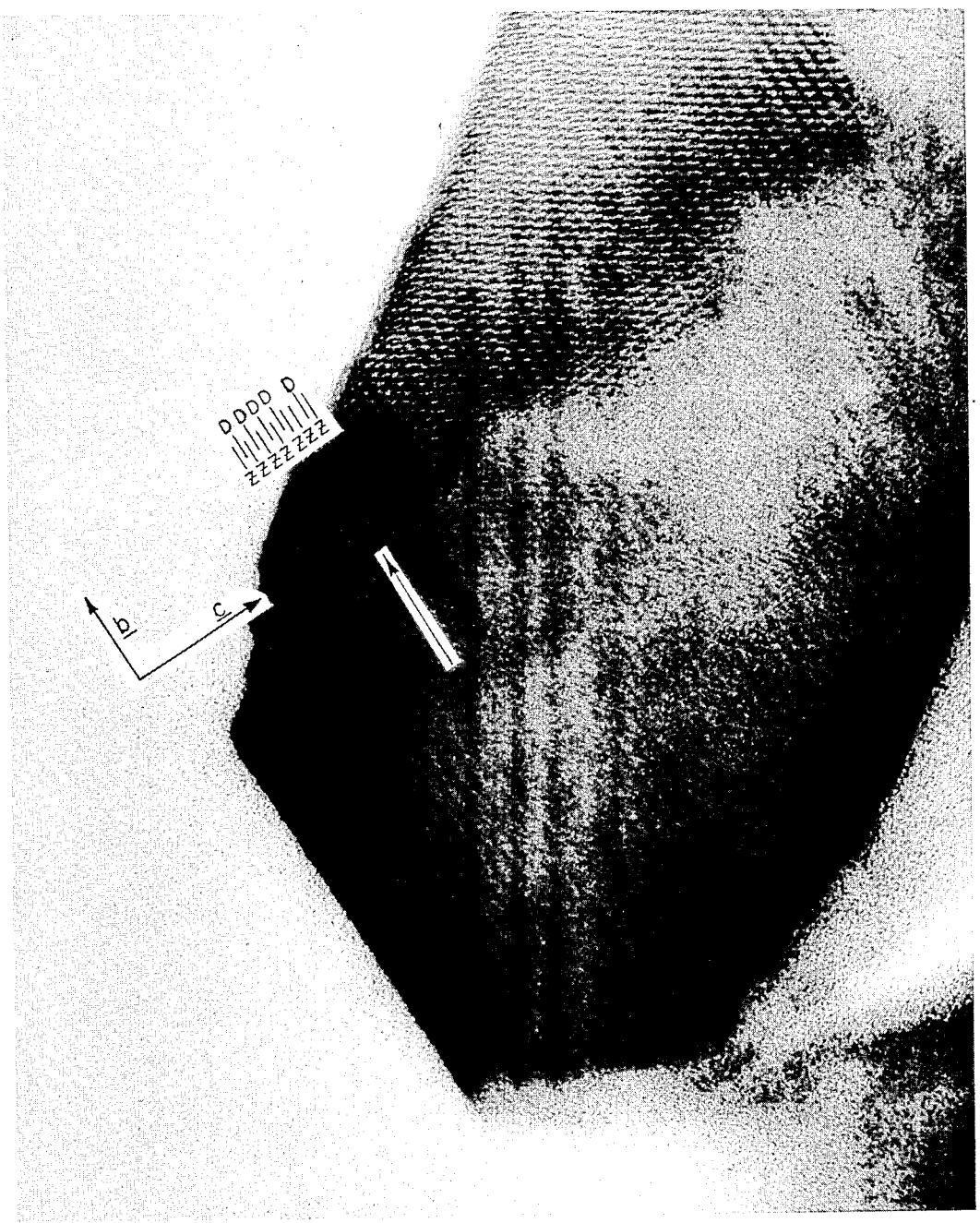
FIG. 2 Is a HRTEM lattice image of the b*c* orientation of an ECR-1 crystal showing intergrowths of DZZ.

FIG. 2 is a HRTEM lattice image of the $b^*c^*$ phase of another largely ECR-1 crystal from the batch in Example 1. The micrograph is similar to the one presented in Example 1 but the alignment of the crystal with respect to the electron beam is not quite as good. As is the case for the micrograph in Example 1, variations in crystal position in the microscope and variations in specimen thickness cause changes in contrast in various regions of the crystal. A region where the sequence DZZ occurs is indicated. A second region nearby also shows an ordering different from that observed in ECR-1. This region contains multiple Z layers but a precise count of the number cannot be made.

Example 3

Figure 3:
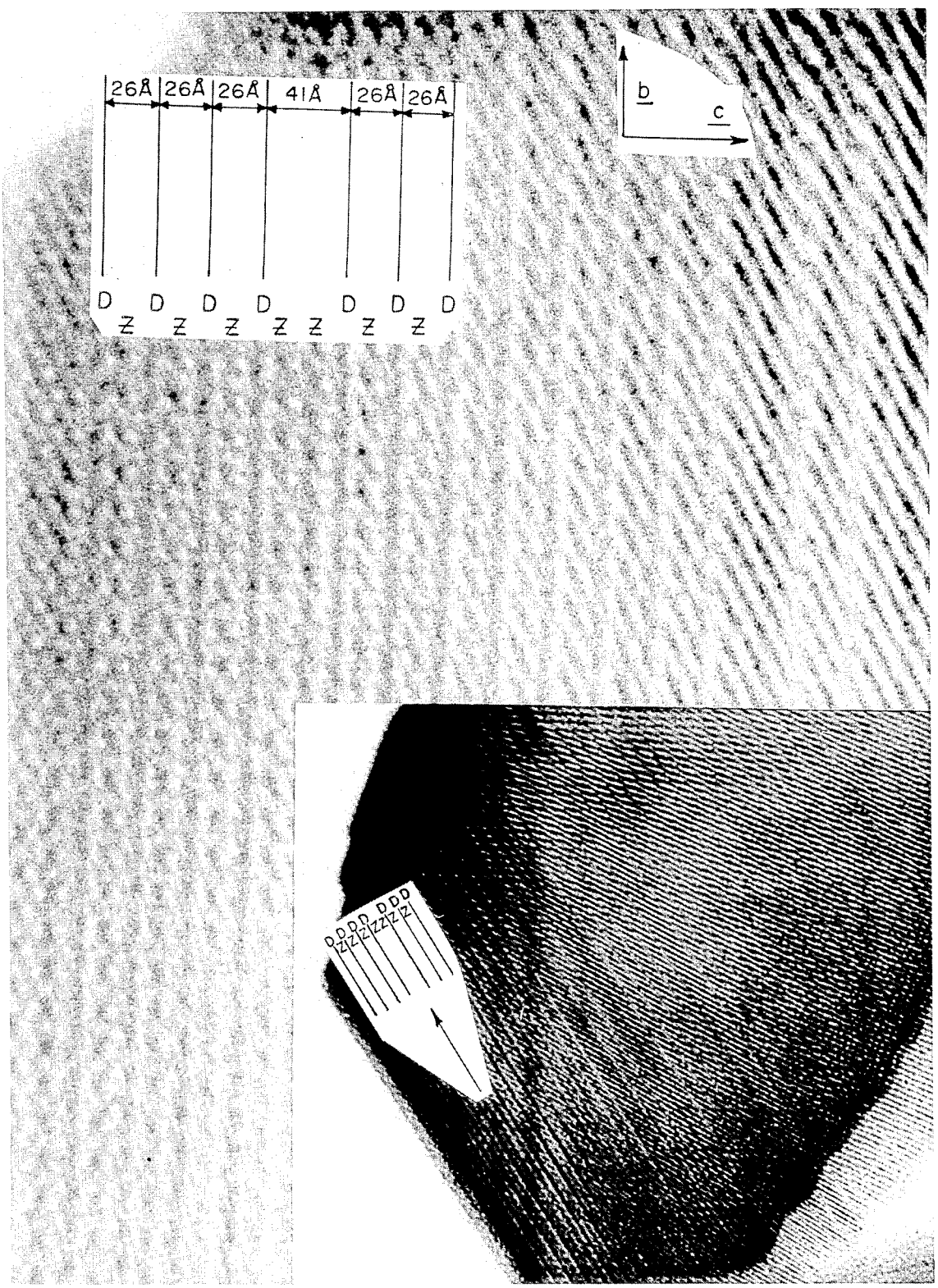
FIG. 3 Is a HRTEM lattice image of the b*c* orientation of another region of the ECR-1 crystal of FIG. 2 above showing more intergrowths.

FIG. 3 is a HRTEM lattice image of the same crystal shown in Example 2 but taken under slightly different microscope conditions. Another region of this sample has been brought into focus. The dark lines in this micrograph in the region indicated show the basic 26Å c-axis spacing expected for an ECR-1 crystal in a $b^*c^*$ orientation. As indicated in the micrograph, a defect occurs in the ordering, leading to a distance between dark lines of 42Å. This feature represents a DZZ sequence in the crystal.

Example 4

Figure 4:
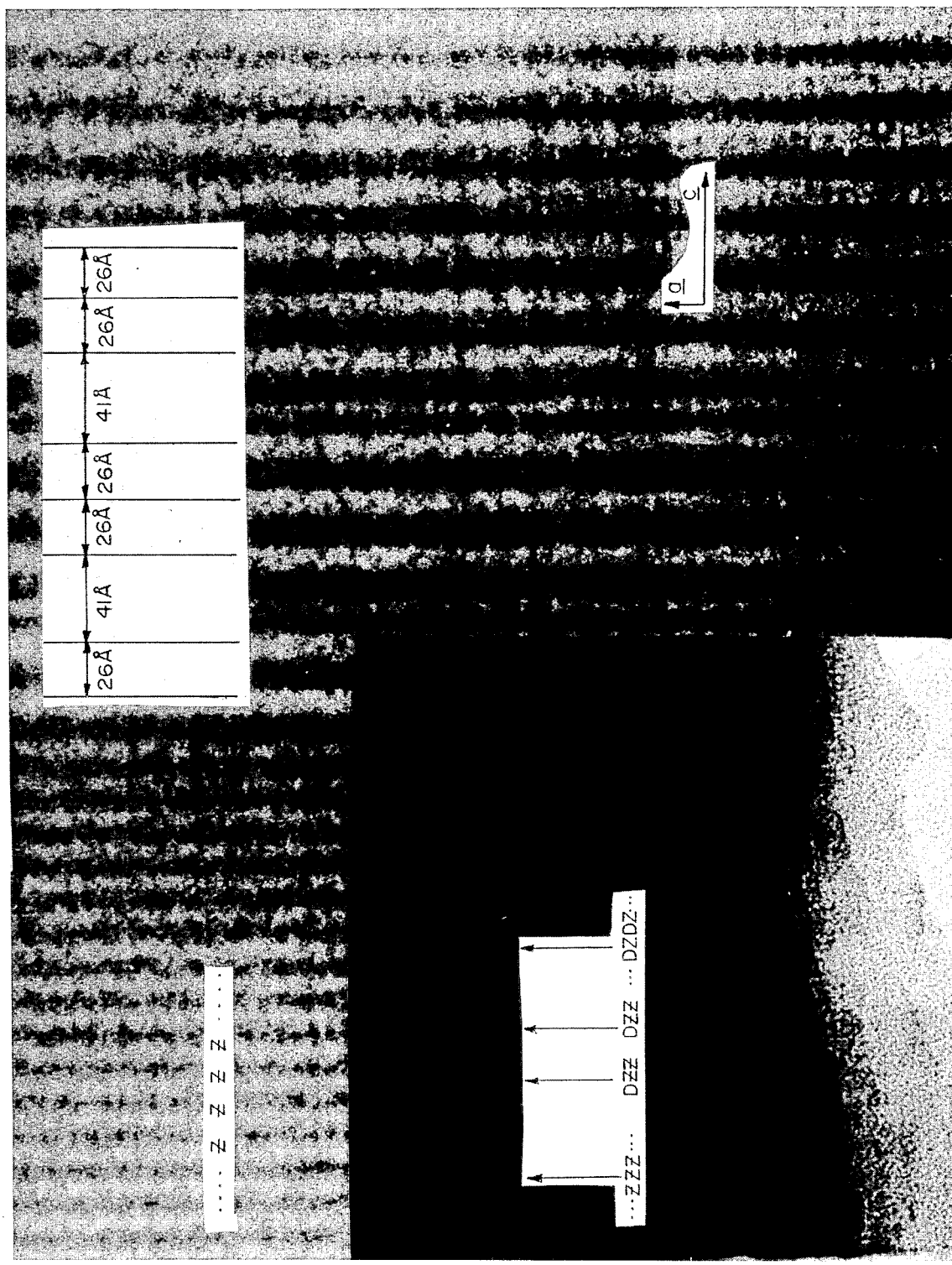
FIG. 4 Is a HRTEM lattice image of the a*c* orientation of an ECR-1 crystal showing a large section of ZZZ intergrowths, characteristic of mazzite.

FIG. 4 is a HRTEM lattice image of an ECR-1 crystal in the $a^*c^*$ orientation. The directions of the crystallographic a and c axes are indicated. A large region of ZZZ . . . intergrowth is indicated and this region is interpreted as being mazzite. There are occasional other changes in ordering along the c axis of the crystal, as is indicated in the micrograph. In this orientation, changes in ordering along the c axis appears as differences in the spacings between lattice lines on the micrograph.

TABLE 1

Crystallographic Summary of the MAZ-MOR ites

| Structure Type | Figure | Ideal Space Group | Ideal c Axis Length, Å | Lowest Angle Reflecting Allowed, Å | |
|---|---|---|---|---|---|
| MORDENITE/MAZZITE Subfamily | | | | | |
| $D_1Z_1$ | 5 | Pmmn | 26.2 | 001 | 26.2 |
| $D_2Z_2$ | 6 | Pmmn | 26.2 | 001 | 26.2 |
| $D_1Z_1Z_1$ | 9 | Amma | 83.6 | 002 | 41.8 |
| $D_2Z_1Z_2$ | 10 | Amma | 83.6 | 002 | 41.8 |
| $D_1D_1Z_1$ | 11 | Amma | 73.6 | 002 | 36.8 |
| $D_1D_2Z_2$ | 12 | Amma | 73.6 | 002 | 36.8 |
| $D_1D_1Z_1Z_1$ | 17 | Pmma | 52.4 | 001 | 52.4 |
| $D_1D_2Z_1Z_2$ | 18 | Pmma | 52.4 | 001 | 52.4 |
| The Mordenite/Omega Subfamily | | | | | |
| $D_1O_1$ | 7 | Bmmb | 52.4 | 002 | 26.2 |
| $D_2O_2$ | 8 | Bmmb | 52.4 | 002 | 26.2 |
| $D_1O_2O_1$ | 13 | Immm | 83.6 | 002 | 41.8 |
| $D_2O_2O_2$ | 14 | Immm | 83.6 | 002 | 41.8 |
| $D_1D_1O_1$ | 15 | Immb | 73.6 | 002 | 36.8 |
| $D_1D_2O_2$ | 16 | Immb | 73.6 | 002 | 36.8 |
| $D_1D_1O_2O_1$ | 19 | Bmmm | 104.8 | 002 | 52.4 |
| $D_1D_2O_2O_2$ | 20 | Bmmm | 104.8 | 002 | 52.4 |

We claim as our invention:

1. A crystalline porous tectosilicate composition characterized as combining mordenite sheets with mazzite or 'omega' sheets, having orthorhombic unit cell parameters of 7.3Å (±0.2), 18.1Å(±0.3) and sum combinations of 10.6Å (±0.2) and 15.6Å(±0.3).

2. The composition of claim 1 having compositions in the anhydrous form in the range 1.0±0.2 $M_{2/N}O:Al_2O_3:X SiO_2$ where M represents a cation of groups 1A and 2A of the periodic table and an alkylammonium ion of the group $E_2$, $M_2$, $P_2 M_2$, $E_3$, M, E $M_3$, $P_3 M$ and $PM_3$, N is the valence of said cation, and X is at least 5.

3. The composition of claim 1 which is further characterized by the formula:

$1.0 \pm 0.2$ $M_{2/N}O:Al_2O_3$:5 to 500 $SiO_2$ where M is a cation and N the valence of said cation 4. The composition of claim 1 intergrown or overgrown with mazzite, mordenite and/or ECR-1

5. The composition of claim 2 wherein M is predominantly hydrogen.

6. The composition of claim 3 wherein M is predominantly hydrogen.

7. The composition of claim 1 having the configuration $D_1Z_1$.

8. The composition of claim 1 having the configuration $D_1O_1$.

9. The crystalline porous tectosilicate of claim 1 having the configuration $D_2O_2$.

10. The crystalline porous tectosilicate of claim 1 having the configuration $D_1Z_1Z_1$.

11. The crystalline porous tectosilicate of claim 1 having the configuration $D_2Z_1Z_2$.

12. The crystalline porous tectosilicate of claim 1 having the configuration $D_1D_2Z_2$.

13. The crystalline porous tectosilicate of claim 1 having the configuration $D_1D_1Z_1$.

14. The crystalline porous tectosilicate of claim 1 having the configuration $D_1D_2Z_2$.

15. The crystalline porous tectosilicate of claim 1 having the configuration $D_1O_2O_1$.

16. The crystalline porous tectosilicate of claim 1 having the configuration $D_2O_2O_2$.

17. The crystalline porous tectosilicate of claim 1 having the configuration $D_1D_1O_1$.

18. The crystalline porous tectosilicate of claim 1 having the configuration $D_1D_2O_2$.

19. The crystalline porous tectosilicate of claim 1 having the configuration $D_1D_1Z_1Z_1$.

20. The crystalline porous tectosilicate of claim 1 having the configuration $D_1D_2Z_1Z_2$.

21. The crystalline porous tectosilicate of claim 1 having the configuration $D_1D_1O_2O_1$.

22. The crystalline porous tectosilicate of claim 1 having the configuration $D_1D_2O_2O_2$.

23. A crystalline porous tectosilicate composition comprising ECR-1 and one or more of intergrown or overgrown structures of mordenite sheets with mazzite or 'omega' sheets or both, having orthorhombic unit cell parameters of 7.3 Å($\pm0.2$), 18.1Å($\pm0.3$) and sum combinations of 10.6 Å($\pm0.2$) and 15.6 Å($\pm0.3$), and optionally mazzite or mordenite.

* * * * *